(12) United States Patent
Oyman et al.

(10) Patent No.: US 11,729,243 B2
(45) Date of Patent: Aug. 15, 2023

(54) DASH-BASED STREAMING OF POINT CLOUD CONTENT BASED ON RECOMMENDED VIEWPORTS

(71) Applicant: Intel Corporation, Santa Clara, CA (US)

(72) Inventors: Ozgur Oyman, Palo Alto, CA (US); Fai Yeung, Palo Alto, CA (US); Harleen Gill, Los Altos, CA (US); Kimberly Loza, San Francisco, CA (US)

(*) Notice: Subject to any disclaimer, the term of this patent is extended or adjusted under 35 U.S.C. 154(b) by 125 days.

(21) Appl. No.: 17/027,524

(22) Filed: Sep. 21, 2020

(65) Prior Publication Data

US 2021/0006614 A1 Jan. 7, 2021

Related U.S. Application Data

(60) Provisional application No. 62/906,958, filed on Sep. 27, 2019, provisional application No. 62/903,616, filed on Sep. 20, 2019.

(51) Int. Cl.
| | |
|---|---|
| *H04L 65/80* | (2022.01) |
| *H04N 19/70* | (2014.01) |
| *H04N 19/30* | (2014.01) |
| *H04N 19/597* | (2014.01) |
| *H04L 65/65* | (2022.01) |
| *H04L 65/70* | (2022.01) |

(52) U.S. Cl.
CPC .............. *H04L 65/80* (2013.01); *H04L 65/65* (2022.05); *H04L 65/70* (2022.05); *H04N 19/30* (2014.11); *H04N 19/597* (2014.11); *H04N 19/70* (2014.11)

(58) Field of Classification Search
CPC ......... H04L 65/80; H04L 65/70; H04L 65/65; H04N 19/30; H04N 19/70
See application file for complete search history.

(56) References Cited

U.S. PATENT DOCUMENTS

| | | | | |
|---|---|---|---|---|
| 2017/0347026 | A1* | 11/2017 | Hannuksela | ......... H04N 21/816 |
| 2018/0276890 | A1* | 9/2018 | Wang | ...................... G06T 15/20 |
| 2019/0373245 | A1* | 12/2019 | Lee | ..................... H04N 21/8456 |
| 2020/0037029 | A1* | 1/2020 | He | ......................... H04N 21/816 |
| 2020/0137136 | A1* | 4/2020 | Skupin | ................. H04N 19/176 |
| 2020/0374505 | A1* | 11/2020 | Kammachi Sreedhar | ................... H04N 21/816 |
| 2020/0382796 | A1* | 12/2020 | Wang | .................. H04N 19/186 |

(Continued)

OTHER PUBLICATIONS

3GPP, Transparent end-to-end Packet-switched Streaming Service (PSS); Progressive Download and Dynamic Adaptive Streaming over HTTP (3GP-DASH) (Release 16), 3GPP TS 26.247 V16.2.0 (Dec. 2019), 139 pages.

(Continued)

*Primary Examiner* — Jonathan A Bui
(74) *Attorney, Agent, or Firm* — Schwabe, Williamson & Wyatt, P.C.

(57) ABSTRACT

Various embodiments herein provide adaptive streaming mechanisms for distribution of point cloud content. The point cloud content may include immersive media content in a dynamic adaptive streaming over hypertext transfer protocol (DASH) format. Various embodiments provide DASH-based mechanisms to support viewport indication during streaming of volumetric point cloud content. Other embodiments may be described and claimed.

18 Claims, 15 Drawing Sheets

(56) References Cited

U.S. PATENT DOCUMENTS

2021/0152808 A1\* 5/2021 He ......................... H04N 21/84
2022/0150552 A1\* 5/2022 Yamagishi .............. H04L 65/70

OTHER PUBLICATIONS

International Standard, "Information technology—Dynamic adaptive streaming over HTTP (DASH)—Part 1: Media presentation description and segment formats," ISO/IEC 23009-1, Third edition Aug. 2019, Reference No. ISO/IEC 23009-1:2019(E), Vudu IPR Exhibit 1067 IPR Petition for U.S. Pat. No. 10,270,830, 236 pages.

\* cited by examiner

DASH-BASED STREAMING OF POINT CLOUD CONTENT BASED ON RECOMMENDED VIEWPORTS

CROSS REFERENCE TO RELATED APPLICATION

The present application claims priority to U.S. Provisional Patent Application No. 62/903,616, which was filed Sep. 20, 2019, and U.S. Provisional Patent Application No. 62/906,958, which was filed Sep. 27, 2019, the disclosures of which are hereby incorporated by reference.

FIELD

Embodiments relate generally to the technical field of wireless communications.

BACKGROUND

Volumetric content distribution is gaining traction to deliver 6 degrees of freedom (6DoF) immersive media experiences. Adaptive streaming based content distribution technologies such as MPEG dynamic adaptive streaming over hypertext transfer protocol (DASH) need to support point cloud content.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
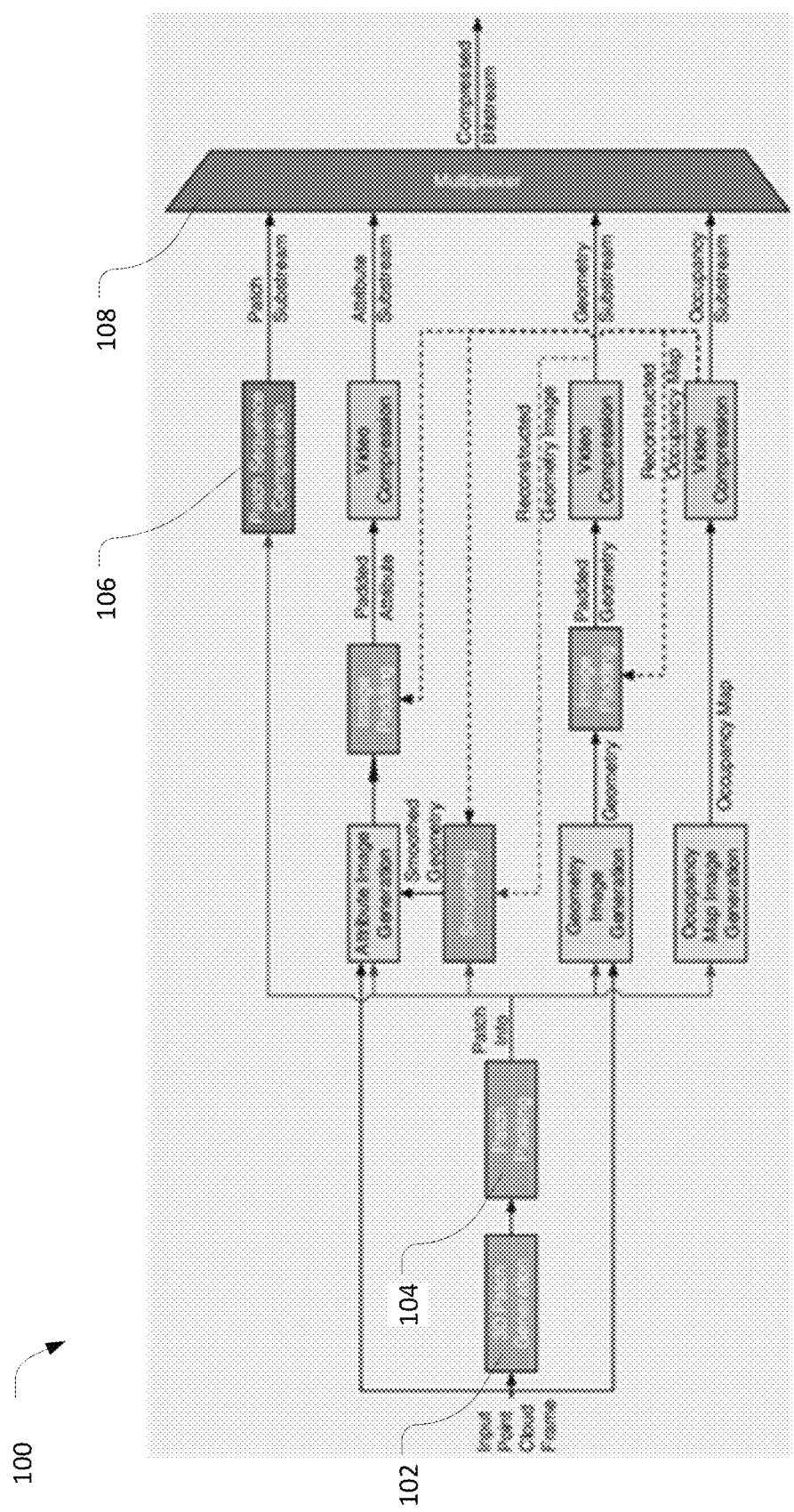
FIG. 1 illustrates a video-based point cloud coding (V-PCC) architecture in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The present disclosure provides DASH-based adaptive streaming mechanisms for distribution of point cloud content. Volumetric content distribution is gaining traction to deliver 6DoF immersive media experiences. Adaptive streaming based content distribution technologies such as MPEG DASH need to support point cloud content. Viewport indication during streaming of volumetric content is essential in order to optimize bandwidth utilization and quality of user experience. The embodiments herein provide DASH-based mechanisms to support viewport indication during streaming of volumetric content. Embodiments provide client feedback signaling mechanisms for DASH-based viewport-dependent adaptive streaming of point cloud content.

Volumetric content distribution is gaining traction to deliver 6DoF immersive media experiences. Adaptive streaming based content distribution technologies such as MPEG DASH need to support point cloud content. Viewport indication during streaming of volumetric content is essential in order to deliver good quality of user experience. In particular, to improve interactivity during streaming of point cloud content, it is desirable to signal user's viewport in the form of a client feedback message to the network so that this information could be: (i) shared with other users in the form of a recommended viewport, e.g., to realize social VR experiences, (ii) used for cloud/edge media processing, e.g., for transcoding or pre-rendering the media at an edge server.

Point Clouds and 6DoF

Initial VR 360 support was limited to 3DoF, which means that the viewing pose is only alterable through rotations on the x, y and z axes, represented as roll, pitch and yaw respectively, and purely translational movement does not result in different media being rendered. As such, VR360 delivered an overall flat experience since it positions the viewer in a static location with limited freedom of movement and low levels of interactivity. This was a limitation in the sense that fully immersive experiences were not possible thereby hurting the user experience and sense of realism. Emerging VR standards and products will provide support for 3DoF+ and 6DoF enhancing the level of immersion and user experience. While 3DoF+ restricts modifications of the viewing position by limiting translational movements of the user's head around the original viewpoint, 6DoF supports both rotational and translational movements allowing the user to change not only orientation but also position to move around in the observed scene. As part of its "Coded Representation of Immersive Media" (MPEG-I) project, MPEG is currently developing the codecs, storage and distribution formats, and rendering metadata necessary for delivering interoperable and standards-based immersive 3DoF+ and 6DoF experiences.

Volumetric video has been recently gaining significant traction in delivering 6DoF experiences. Volumetric video contains spatial data and enables viewers to walk around and interact with people and objects, and hence it is far more immersive than 360 video footage because it captures the movements of real people in three dimensions. Users can view these movements from any angle by using positional tracking. Point clouds are a volumetric representation for describing 3D objects or scenes. A point cloud comprises a set of unordered data points in a 3D space, each of which is specified by its spatial (x, y, z) position possibly along with other associated attributes, e.g., RGB color, surface normal, and reflectance. This is essentially the 3D equivalent of well-known pixels for representing 2D videos. These data points collectively describe the 3D geometry and texture of the scene or object. Such a volumetric representation lends itself to immersive forms of interaction and presentation with 6DoF.

Point cloud is a form of representing 3D environments.
A point cloud is a set of points {v}, each point v having a spatial position (x, y, z) comprising the geometry and a vector of attributes such as colors (Y, U, V), normals, curvature or others.
A point cloud may be voxelized by quantizing the point positions to lie on an integer grid within a bounding cube. =>Allows for more efficient real time processing
Cube of voxels in 3D are somewhat equivalent of Pixels in 2D
A voxel is said to be occupied if it contains any point of the point cloud.
Higher level representation that color and depth maps
Since such point cloud representations require a large amount of data, development of efficient compression techniques is desirable in order to reach consumers using typical broadband access systems.

FIG. 1 provides an example video-based point cloud coding (V-PCC) architecture 100 in accordance with various embodiments. The V-PCC architecture 100 may allow reusing the legacy video codecs such as H.264/AVC and H.265/HEVC. In particular, the 3D geometry and attribute data of the point cloud are transformed into a set of 2D patches. Such patches are then packed into images, which can then be compressed with any existing or future image or video codec, such as MPEG-4 advanced video coding (AVC), high-efficiency video coding (HEVC), AV1, etc.

V-PCC exploits a patch-based approach to segment the point cloud into a set of clusters (also referred to as patches), e.g., by patch generation block 102 and patch packing block 104. These patches can be mapped to a predefined set of 2D planes through orthogonal projections, without self-occlusions and with limited distortion. The objective is to find a temporally coherent, low-distortion, injective mapping, which would assign each point of the 3D point cloud to a cell of the 2D grid. A mapping between the point cloud and a regular 2D grid is then obtained by packing the projected patches in the patch-packing process.

All patch information that is required to reconstruct the 3D point cloud from the 2D geometry, attribute, and occupancy videos also needs to be compressed. Such information is encoded in the V-PCC patch sequence substream (e.g., at block 106). V-PCC introduces a new codec specifically optimized to handle this substream, which occupies a relatively small amount of the overall bitstream (e.g., lower than 5%). Additional information needed to synchronize and link the video and patch substreams is also signaled in the bitstream.

The V-PCC bitstream is then formed by concatenating the various encoded information (e.g., occupancy map, geometry, attribute, and patch sequence substreams) into a single stream (e.g., at multiplexer 108). This is done by encapsulating these substreams into V-PCC data units, each consisting of a header and a payload.

The V-PCC unit header describes the V-PCC unit type. Currently, five different unit types are supported. The sequence parameter set (SPS) unit type describes the entire V-PCC bitstream and its subcomponents. The remaining unit types include the occupancy-video, geometry-video, attribute-video, and patch-sequence data units, which encapsulate the occupancy map, geometry, attribute, and patch sequence substreams, respectively The V-PCC decoding process is split into two phases: 1) the bitstream decoding process and 2) the reconstruction process. The bitstream decoding process takes as input the V-PCC compressed bitstream and outputs the decoded occupancy, geometry, and attribute 2D video frames, together with the patch information associated with every frame.

The reconstruction process uses the patch information to convert the 2D video frames into a set of reconstructed 3D point-cloud frames. The reconstruction process requires the occupancy, geometry, and attribute video sequences to be resampled at the nominal 2D resolution specified in the SPS. The resampled videos are then used for the 3D reconstruction process, which consists of two main steps: 1) the geometry and attribute reconstruction and 2) the geometry and attribute smoothing.

The patch-packing process is constrained to guarantee no overlapping between patches. Furthermore, the bounding box of any patch, expressed in terms of T×T blocks, where T is the packing block size, should not overlap with any T×T block belonging to a previously encoded patch. Such constraints make it possible to determine, for each T×T block of the packing grid, the patch to which it belongs by analyzing the 2D bounding boxes of all patches.

The T×T blocks are then processed in parallel to generate the point-cloud geometry and attributes. For each cell of a T×T block, the corresponding pixel in the occupancy map is used to determine whether the cell is full or empty. If the cell is full, a 3D point is generated following two different procedures, depending on the type of the patch.

V-PCC supports the concept of regular patches, which use the patch projection method described earlier. For regular patches, the 3D point Cartesian coordinates are computed by combining the depth information stored in the geometry image with the cell's 2D location, the patch's 3D offset, and the 2D projection plane. The attribute values associated with the reconstructed points are obtained by sampling the 2D attribute frames at the same grid location.

Dynamic Adaptive Streaming over HTTP (DASH)

HTTP streaming is spreading widely as a form of multimedia delivery of Internet video. HTTP-based delivery provides reliability and deployment simplicity due to the already broad adoption of both HTTP and its underlying TCP/IP protocols. DASH provides an overview of elements and attributes that may be used to describe components and properties of a media presentation in an MPD. The MPD is a metadata file that provides information on the structure and different versions of the media content representations stored in one or more server(s) including different bitrates, frame rates, resolutions, codec types, etc. In addition, DASH also specifies the segment formats, for example, containing information on the initialization and media segments for the media engine to ensure mapping of segments into media presentation timeline for switching and synchronous presentation with other representations. Based on this MPD metadata information that describes the relation of the segments and how they form a media presentation, clients request the segments using HTTP GET or partial GET methods. The client fully controls the streaming session including management of on-time request and smooth playout of the sequence of segments, potentially adjusting bitrates or other attributes, for example, to react to changes of the device state or the user preferences.

Figure 2:
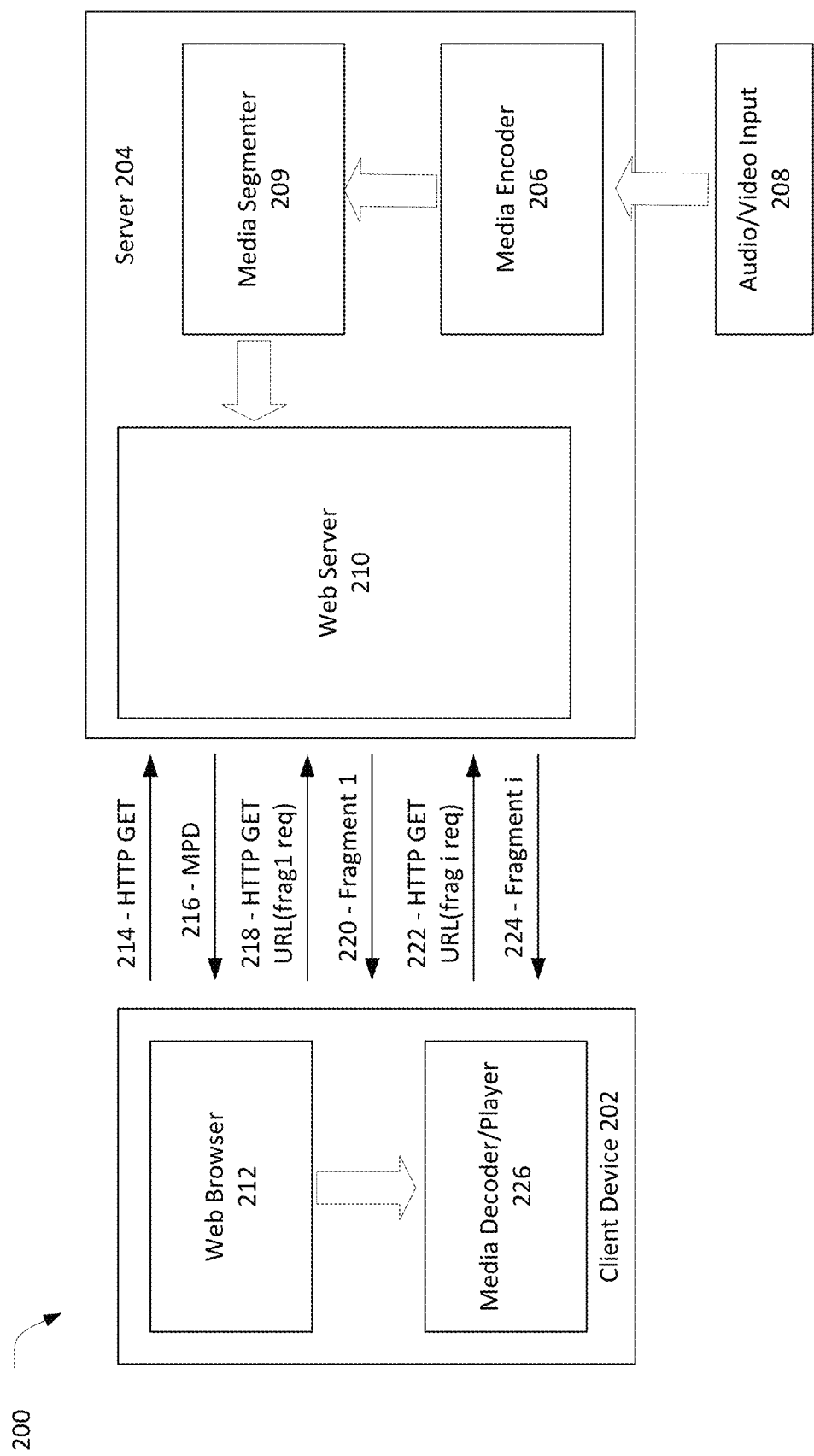
FIG. 2 illustrates a procedure for dynamic adaptive streaming over hypertext transfer protocol (DASH) streaming between a client device and a server, in accordance with various embodiments.

For example, FIG. 2 illustrates a procedure 200 for DASH streaming that may be performed by a client device 202 and web/media server 204. A media encoder 206 may receive media input (e.g., audio/video input) 208 and encode the received media (e.g., using a codec). The media encoder 206 may provide the encoded media to a media segmenter 209 that generates DASH segments from the encoded media. The segments are provided to a web server 210.

The client device 202 may include a web browser 212 that retrieves content from the web server 210 using HTTP GET requests. For example, the web browser 212 may send an HTTP GET request at 214 to request the MPD associated with a media presentation. At 216, the web server 210 may transmit the MPD to the web browser 212. The MPD may indicate an index of each segment and associated metadata information.

The web browser 212 may request fragments/segments of the media presentation based on the MPD. For example, at 218, the web browser 212 may request a Fragment 1 (e.g., HTTP GET URL(frag1 reg)) from the web server 210. The URL in the HTTP GET request may indicate the segment that is requested by the client. At 220, the web server 210 may send Fragment 1 to the web browser 212. At 222, the web browser 212 may send a request for Fragment i to the web server 210, which is provided by the web server 210 at 224. The web browser 212 may provide the received fragments of the media presentation to a media decoder/player 226 of the client device 202.

Although the media encoder 206, media segmenter 209, and web server 210 are all illustrated as part of server 204, it will be understood that one or more of these elements may be included in separate devices in some embodiments.

Viewport Indication for Point Cloud Video

Viewport-dependent streaming approach allows different areas/regions of the VR360 video to be delivered with different quality or resolution, realizing the best quality-bandwidth tradeoff. The same approach can be applicable for streaming of point cloud video content as well. Edge enhancements enabled by 5G can also help in improving viewport-dependent point cloud content delivery, where high quality viewport-specific video data (e.g., tiles) corresponding to portions of the point cloud content for different fields of view (FoVs) at various quality levels may be cached at the edge (e.g., edge network) and delivered to the client device with very low latency based on the user's FOV information. Some example use cases are as follows:

On-demand: High quality point cloud/volumetric content is (potentially generated and) stored in the cloud and edge along with the various high quality viewport-specific video data (e.g., tiles) corresponding to portions of the content for different FoVs at various quality levels through multiple encodings. Then the service provider receives user's FoV information from the client device and only sends video data (e.g., tiles) that correspond to the user's current viewport in high quality. A lower quality encoding of the whole scene is streamed as well as a backup to handle any abrupt changes to the user FoV. As another option to this use case, instead of storing the various high quality viewport-specific video data at the edge, the service provider may generate these on-the-fly at the edge based on received user FoV information.

Live: High quality point cloud/volumetric content is captured live and pushed to the cloud and edge. This may potentially also involve live cloud-based production media workloads on the volumetric content, which may for instance include live point cloud or texture-and-mesh generation for volumetric video. Various high quality viewport-specific video data (e.g., tiles) corresponding to portions of the content for different FoVs can also be generated at various quality levels through multiple encodings in the cloud and pushed to the edge. Then the service provider receives user's FoV information from the client device and only sends video data (e.g., tiles) that correspond to the user's current viewport in high quality. A lower quality encoding of the whole scene is streamed as well as a backup to handle any abrupt changes to the user FoV. As another option to this use case, instead of storing the various high quality viewport-specific video data at the edge, the service provider may generate these on-the-fly at the edge based on received user FoV information.

Figure 3:
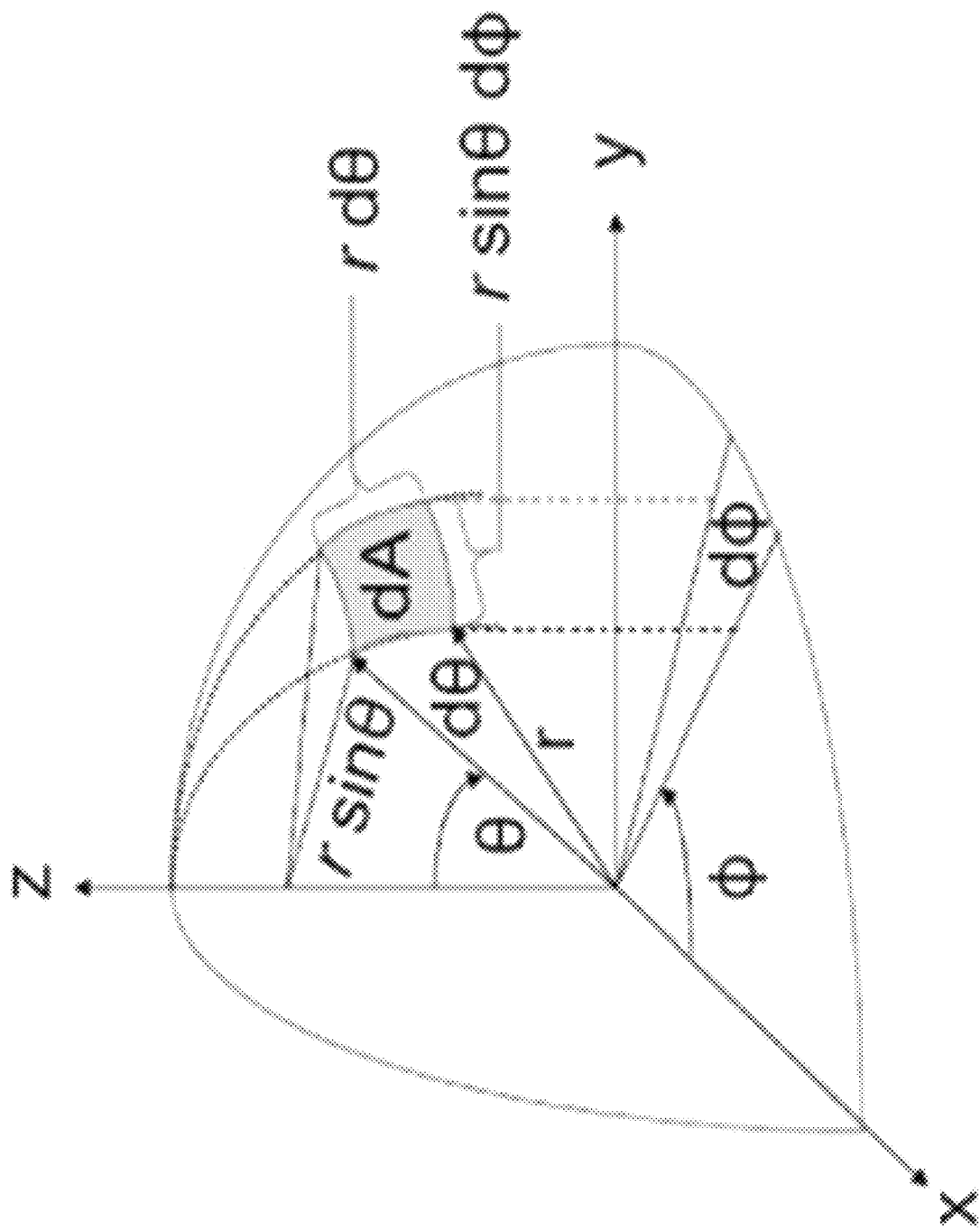
FIG. 3 illustrates viewport information for a region of interest in accordance with various embodiments.

Viewport indication comprises signalling a recommended region of interest (ROI) of a video to a client device so that the client device can choose and request content according to its viewport. For example, the receiver client device may choose an appropriate encoding and transmission parameters for the sending client device to transmit the viewport. For point cloud videos, the ROI or viewport indication can be made using the spherical coordinate system shown by FIG. 3 to cover rotational movements of the viewport, plus the x-y-z (e.g., Cartesian) coordinates of the center point of the sphere that contains the ROI or viewport (to cover translational movements of the viewport).

Figure 4:
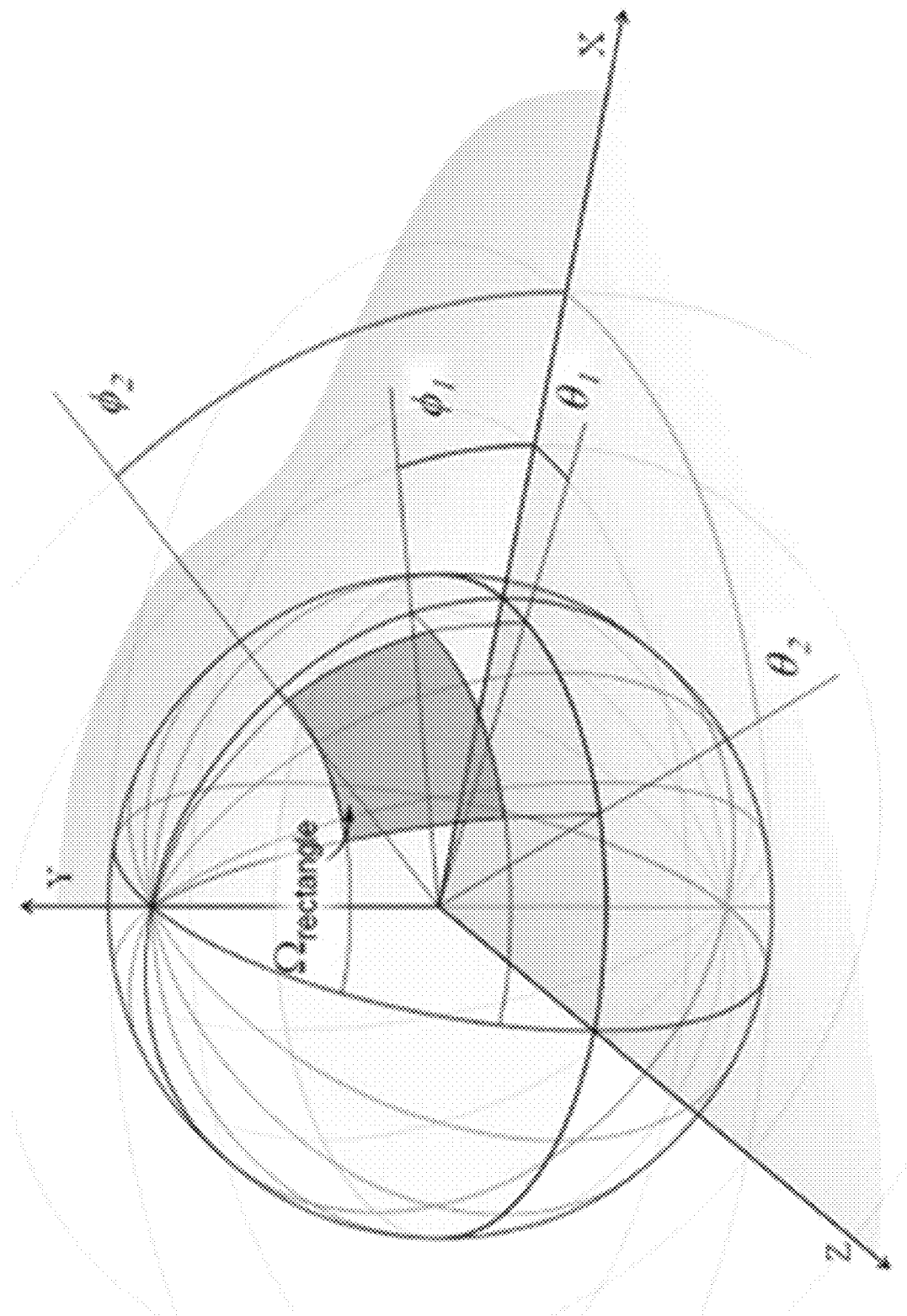
FIG. 4 illustrates angle parameters of viewport information in accordance with various embodiments.
Figure 5:
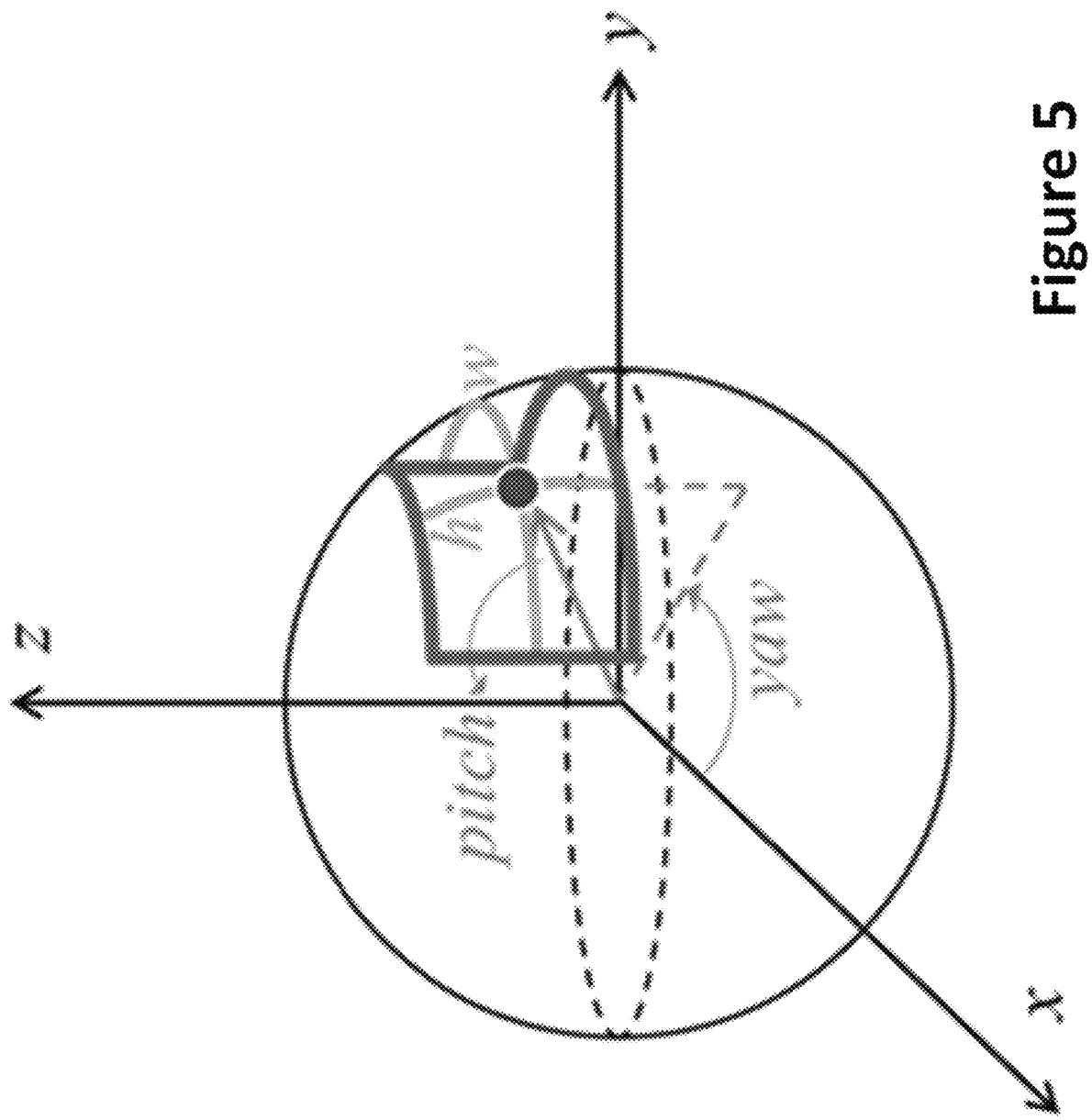
FIG. 5 illustrates additional parameters of viewport information in accordance with various embodiments.

By providing angle information (e.g., dθ and dφ in spherical coordinates) to each of the differential areas (e.g., the dA in FIG. 3), the MTSI receiver can communicate its requested ROI/viewport to the MTSI sender. This is depicted by FIG. 4, where ROI/viewport information is composed of communicating the $\theta_1$, $\theta_2$, $\varphi_1$ and $\varphi_2$ parameters, where $\theta_1$ is the angle between the VR origin and the left side of the differential area, $\theta_2$ is the angle between the VR origin and the right side of the differential area, $\varphi_1$ is the angle between the VR origin and the top side of the differential area and $\varphi_2$ is the angle between the VR origin and the bottom side of the differential area.

The VR origin is the position of the center point of the spatial subpart, which is given in pixel units, from the top left corner of the grid cell in which it is located and expressed by the values that contain x and y coordinates in pixel units (e.g., "640,360"). This leads to the following definition of ROI parameters:

ROI_yaw: signed integer in decimal representation expressing the yaw angle of the center of the desired ROI in arbitrary units.

ROI_pitch: signed integer in decimal representation expressing the pitch angle of center of the desired ROI in arbitrary units.

ROI width: signed integer in decimal representation expressing the width in angular length of the desired ROI in arbitrary units.

ROI_height: signed integer in decimal representation expressing the height in angular length of the desired ROI in arbitrary units.

ROI_x: non-negative integer in decimal representation expressing the horizontal position of the top-left corner of the desired ROI in arbitrary units.

ROI_y: non-negative integer in decimal representation expressing the vertical position of the top-left corner of the desired ROI in arbitrary units.

Center_x: non-negative integer in decimal representation expressing the x-coordinate of the center point of the sphere containing the desired ROI in arbitrary units. —this is to cover translational movements of the viewport.

Center_y: non-negative integer in decimal representation expressing the y-coordinate of the center point of the sphere containing the desired ROI in arbitrary units. —this is to cover translational movements of the viewport.

Center_z: non-negative integer in decimal representation expressing the z-coordinate of the center point of the sphere containing the desired ROI in arbitrary units. —this is to cover translational movements of the viewport.

ROI_start_pitch: non-negative integer in decimal representation expressing the starting pitch angle of the specific area of the sphere, corresponding to the desired ROI.

ROI_end_pitch: non-negative integer in decimal representation expressing the ending pitch angle of the specific area of the sphere, corresponding to the desired ROI.

ROI start_yaw: non-negative integer in decimal representation expressing the starting yaw angle of the specific area of the sphere, corresponding to the desired ROI.

ROI end_yaw: non-negative integer in decimal representation expressing the ending yaw angle of the specific area of the sphere, corresponding to the desired ROI.

Figure 6:
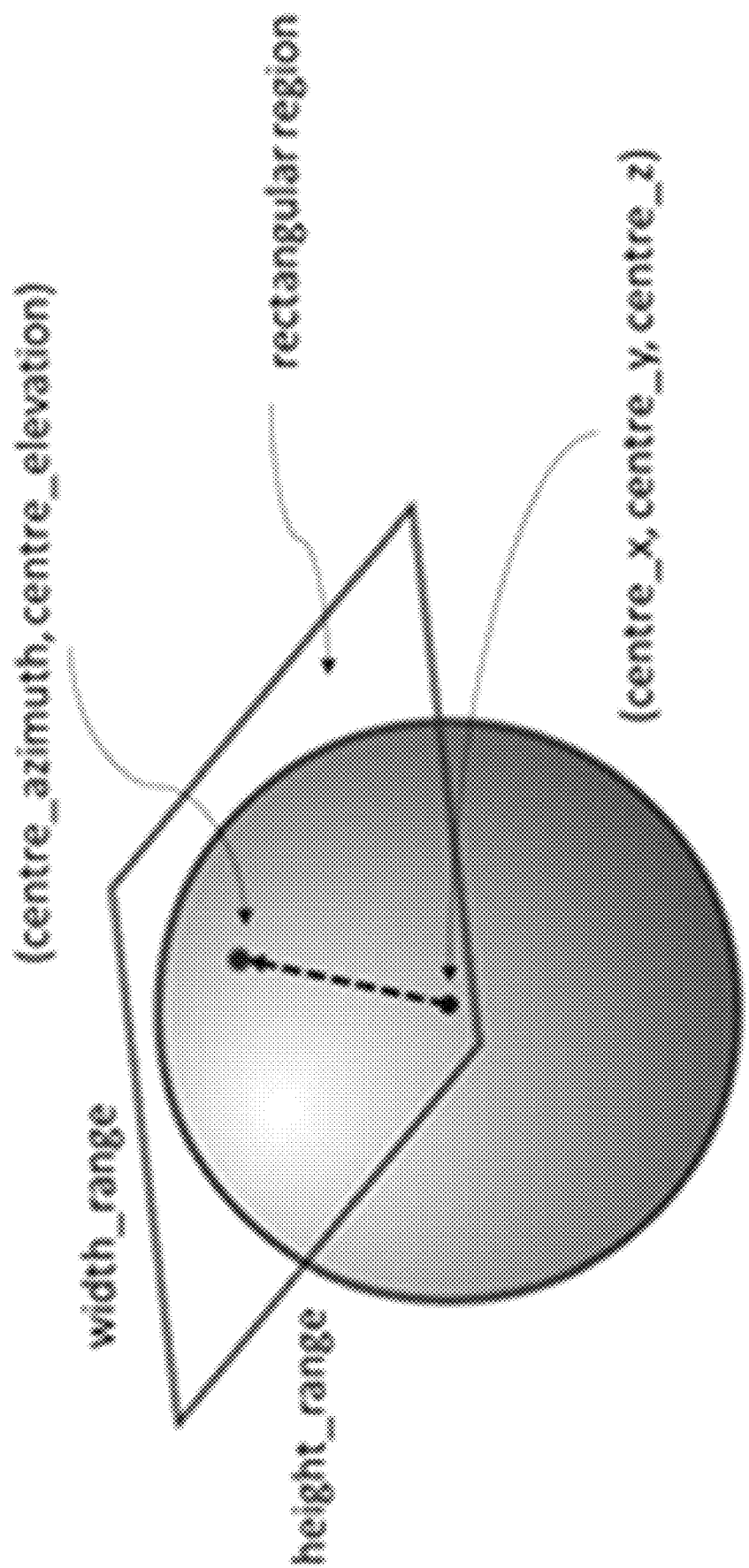
FIG. 6 illustrates viewport information for a two-dimensional (2D) planar region, in accordance with various embodiments.

Depending on the viewing devices being used by a client device, a viewport can also be considered as a 2D planar region instead of a 3D spherical region in the 3D space with 6DoF. In this case, the viewport is a 2D viewport with 2D rectangular regions, rather than 3D spherical regions, as shown by FIG. 6.

Point Cloud Media Encapsulation and Signalling in DASH

Figure 7:
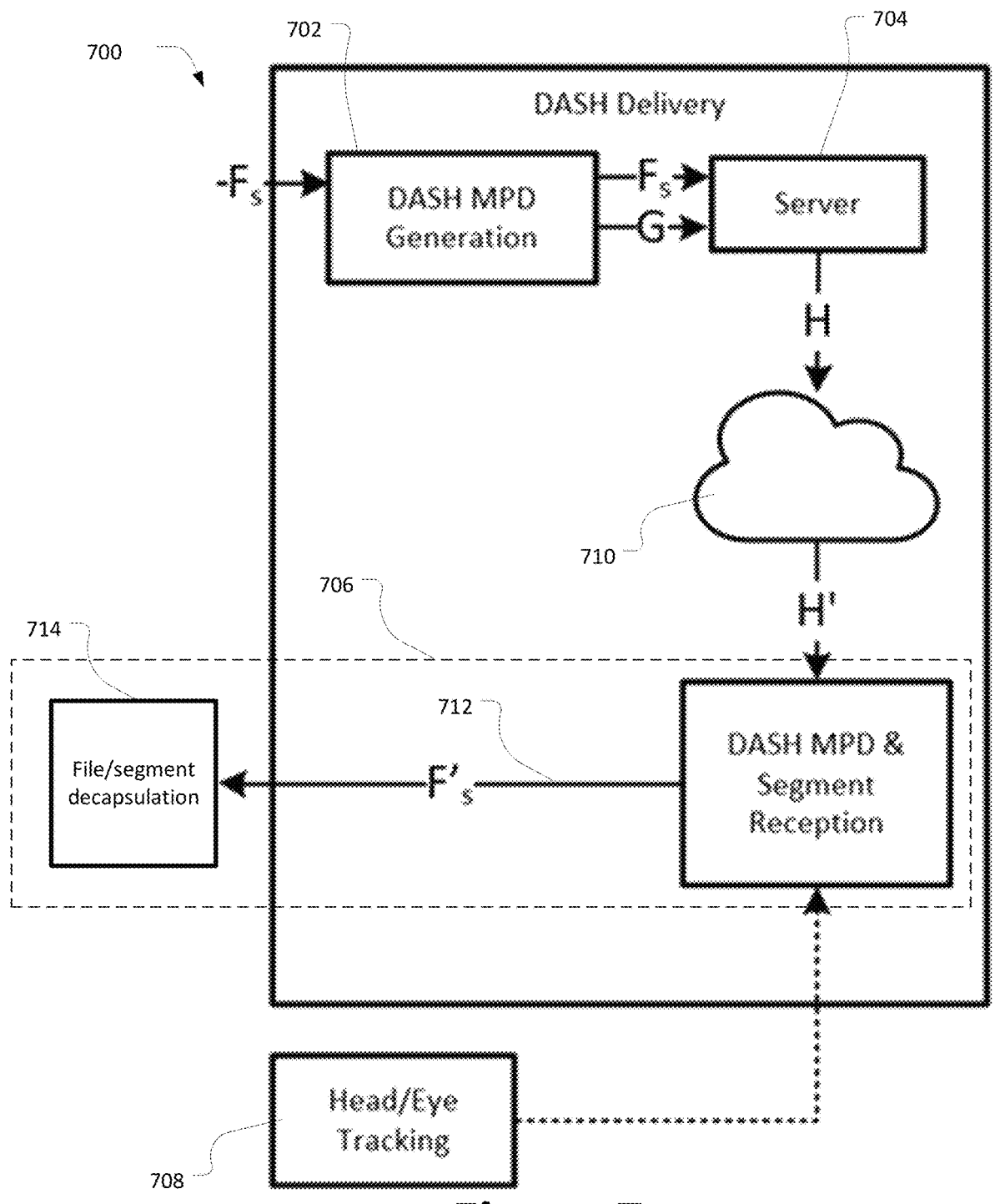
FIG. 7 illustrates content flow in a DASH delivery function for point cloud content delivery in accordance with various embodiments.

FIG. 7 illustrates the content flow in the DASH delivery function for point cloud content delivery. The following interfaces (depicted in FIG. 7) may be part of the DASH delivery:

$F_s/F'_s$: initialization and media segments; as defined generally below and specified for media profiles in 3GPP TS 26.247

G: DASH Media Presentation Description (MPD) or manifest file, including point cloud media-specific metadata An MPD generator 702 may generate an MPD (G) based on the segments ($F_s$). The MPD may be generated further based on other media files representing the same content. The DASH MPD generator includes point cloud media-specific descriptors. These descriptors may be generated on the basis of the equivalent information in the segments. The MPD generator 702 may provide the MPD (G) and media segments ($F_s$) to a server 704. In embodiments, the MPD generator 702 may be included in the server 704 or in another device. The server 704 may provide the MPD to a DASH client 706.

The DASH client 706 obtains viewport information from a user device 708 (e.g., a head-mounted display that detects the user's position and orientation, such as the orientation of the head and/or eyes of the user). By parsing metadata from the MPD, the DASH client 706 determines which Adaptation Set and Representation cover the current viewing position and orientation. The DASH client 706 may further determine the representation that has the highest quality and/or bitrate that may be afforded by the prevailing estimated network throughput. The DASH client issues (Sub) Segment requests accordingly.

The server 704 may provide segments ($F_s$) to the DASH client 706, e.g., in response to HTTP GET requests. The server 704 may also provide the MPD (considered as part of interface H in this case), or the MPD may be delivered by other means to the DASH client 706. The segments and MPD are delivered over a network 710. The received segments and MPD from the server 704 are marked with H' in FIG. 7. The output from the server 706 (H) is considered to be identical to the input to the DASH client 706 (H'). The received segments ($F'_s$) may be received by a DASH MPD and segment reception block 712 of the DASH client 706 and provided to a File/segment decapsulation block 714 of the DASH client 706.

Signalling of Point Cloud Recommended Viewports

A SupplementalProperty element with a @schemeIdUri attribute equal to "urn:mpeg:mpegI:pcc:2019:cc" may be defined for the recommended viewport with a content coverage (CC) descriptor in order to signal the recommended viewports of the point cloud content. For each recommended viewport, the content provider basically optimally produced and encoded the point cloud content to be viewed from that particular viewport with a corresponding content coverage description. The described viewport could for instance indicate the presence of a physical or virtual camera angle from which the content is produced. Moreover, depending on the viewport, for instance the content encoding may prioritize certain point cloud objects and/or encode certain point cloud regions or objects with higher quality compared to other regions or objects in the point cloud.

For live presentations (with dynamic manifests or MPDs), changes in recommended viewports may be signaled via regular MPD updates.

At most one recommended viewport indication with a content coverage descriptor may be present at adaptation set level. A recommended viewport indication with a content coverage descriptor is not expected to be present at the MPD or representation level, but it could be present at either level.

Depending on user's viewing devices, a viewport can be considered as a 3D spherical region or 2D planar region in the 3D space with 6DoF, and hence 2D viewport or 3D viewport, respectively.

The Point Cloud recommended 3D viewport indication with a content coverage descriptor indicates that each Representation is produced for the 3D viewport with the sphere region as specified by syntax elements center_azimuth, center_elevation, center tilt, azimuth_range, and elevation_range to indicate the spherical coordinate system (to cover rotational movements of the viewport), plus syntax elements center_x, center_y and center_z to indicate the x-y-z coordinates of the center point of the sphere that contains the viewport to cover translational movements of the viewport.

The Point Cloud recommended 2D viewport indication with a content coverage descriptor indicates that each Representation is produced for the 2D viewport with the rectangular region as specified by syntax elements center_azimuth, center_elevation, center tilt, width_range, and height_range to indicate the rectangular coordinate system (to cover planar movements of the viewport), plus syntax elements center_x, center_y and center_z to indicate the x-y-z coordinates of the center point of the sphere that contains the viewport to cover translational movements of the viewport.

Moreover, it may be possible to indicate recommended viewports via specific contextual information (e.g., the position of the ball, position of a star player, etc.) along with (or instead of) the coordinate-based description of the content coverage. One way to signal this information would be to define a string value associated with each adaptation set to carry the relevant contextual information. Another option may be to signal an object_ID value, which refers to the specific point cloud object from which the viewport may be derived. Yet another option may be to signal a patch ID value, which refers to the specific point cloud patch from which the viewport may be derived. Object or patch ID information may be signalled in conjunction with the viewport coordinate information in order to provide more specifics about the x-y-z coordinates and spherical viewing position of the viewport.

At the beginning of the DASH/HLS media presentation, all of the recommended viewports for the point cloud content will be signaled to the DASH/HLS client as part of the MPD or manifest file. Depending of the viewing preference of the user, the DASH/HLS client would determine which viewport is desired by the user, and fetch the DASH/HLS representations from the adaptation set corresponding to that viewport. During the presentation, the user may decide to switch the viewport (e.g., rather than view the game from the stadium, switch on to a specific player or maybe follow the ball), and then the DASH client would switch to the adaptation set corresponding to the new viewport and fetch the corresponding DASH representations.

The CC descriptor for indication of recommended viewports for point cloud content includes elements and attributes as specified in Table 1.

TABLE 1

Semantics of elements and attributes of CC descriptor

| Elements and attributes for CC descriptor | Use | Data type | Description |
|---|---|---|---|
| Cc | 0 . . . 1 | pcc: CCType | Container element whose attributes and elements specify point cloud region coverage information. |
| cc.coverageInfo | 1 . . . 255 | pcc: coverageInfoType | Element whose attribute cc.coverageInfo@view_idc, when present, provides information about view(s) to which coverage specified by sphere region defined by attributes cc.coverageInfo@centre_azimuth, cc.coverageInfo@centre_elevation, cc.coverageInfo@centre_tilt, cc.coverageInfo@azimuth_range, cc.coverageInfo@elevation_range, cc.coverageInfo@width_range, cc.coverageInfo@height_range, cc.coverageInfo@center_x, cc.coverageInfo@center_y, cc.coverageInfo@center_z, cc.coverageInfo@object_id, cc.coverageInfo@context applies. |
| cc.coverageInfo@view_idc | CM | pcc: ViewType | Value 1 indicates that the sphere region is on the left view of a stereoscopic content, value 2 indicates the sphere region is on the right view of a stereoscopic content, and value 3 indicates that the sphere region is on both the left and right views. Value 0 is reserved. |
| cc.coverageInfo@center_azimuth | O | Range is $[-180*2^{-16}, 180*2^{-16}]$ | Specifies the azimuth of the centre point of the sphere region in units of $2^{-16}$ degrees relative to the global coordinate axes. When not present, cc.coverageInfo@centre_azimuth is inferred to be equal to 0. |
| cc.coverageInfo@center_elevation | O | Range is $[-90*2^{-16}, 90*2^{-16}]$ | Specifies the elevation of the centre point of the sphere region in units of $2^{-16}$ degrees relative to the global coordinate axes. When not present, cc.coverageInfo@centre_elevation is inferred to be equal to 0. |
| cc.coverageInfo@center_tilt | O | Range is $[-180*2^{-16}, 180*2^{-16}]$ | Specifies the tilt angle of the sphere region, in units of $2^{-16}$ degrees, relative to the global coordinate axes. When not present, cc.coverageInfo@centre_tilt is inferred to be equal to 0. |
| cc.coverageInfo@azimuth_range | O | Int | Specifies the azimuth range of the sphere region through the centre point of the sphere region in units of $2^{-16}$ degrees. When not present cc.coverageInfo@azimuth_range is inferred to be equal to $360 * 2^{16}$. Only relevant for 3D viewports |

TABLE 1-continued

Semantics of elements and attributes of CC descriptor

| Elements and attributes for CC descriptor | Use | Data type | Description |
|---|---|---|---|
| cc.coverageInfo@elevation_range | O | Int | Specifies the elevation range of the sphere region through the centre point of the sphere region in units of $2^{-16}$ degrees. When not present cc.coverageInfo@elevation_range is inferred to be equal to $180 * 2^{16}$. Only relevant for 3D viewports |
| cc.coverageInfo@width_range | O | Int | Specifies the width range of the rectangular region through its center point. Only relevant for 2D viewports. |
| cc.coverageInfo@height_range | O | Int | Specifies the height range of the rectangular region through its center point. Only relevant for 2D viewports |
| cc.coverageInfo@center_x | O | Int | Integer in decimal representation expressing the x-coordinate of the center point of the sphere containing the viewport in arbitrary units |
| cc.coverageInfo@center_y | O | Int | Integer in decimal representation expressing the y-coordinate of the center point of the sphere containing the viewport in arbitrary units |
| cc.coverageInfo@center_z | O | Int | Integer in decimal representation expressing the z-coordinate of the center point of the sphere containing the viewport in arbitrary units |
| cc.coverageInfo@object_id | O | Int | Integer expressing the object ID associated with the viewport. Object ID information may or may not be signalled in conjunction with the viewport coordinate information. |
| cc.coverageInfo@patch_id | O | Int | Integer expressing the patch ID associated with the viewport. Patch ID information may or may not be signalled in conjunction with the viewport coordinate information. |
| cc.coverageInfo@context | O | String | String describing the contextual information associated with the viewport, e.g., "ball", "player", etc. Context information may or may not be signalled in conjunction with the viewport coordinate information. |

MPEG's Server and Network Assisted DASH (SAND)

Server and Network Assisted DASH (SAND) introduces messages between DASH clients and network elements or between various network elements for the purpose to improve efficiency of streaming sessions by providing information about real-time operational characteristics of networks, servers, proxies, caches as well as DASH client's performance and status. In particular, MPEG SAND aims to enable better cooperation between the DASH client and server operations, and provides the standardized interfaces toward realizing the following benefits for streaming services:

Streaming enhancements via intelligent caching, processing and delivery optimizations on the server and/or network side, based on feedback from clients on anticipated DASH Segments, accepted alternative DASH Representations and Adaptation Sets, and requested bandwidth.

Improved adaptation on the client side, based on network/server-side information such as cached Segments, alternative Segment availability, and network throughput/QoS.

Figure 8:
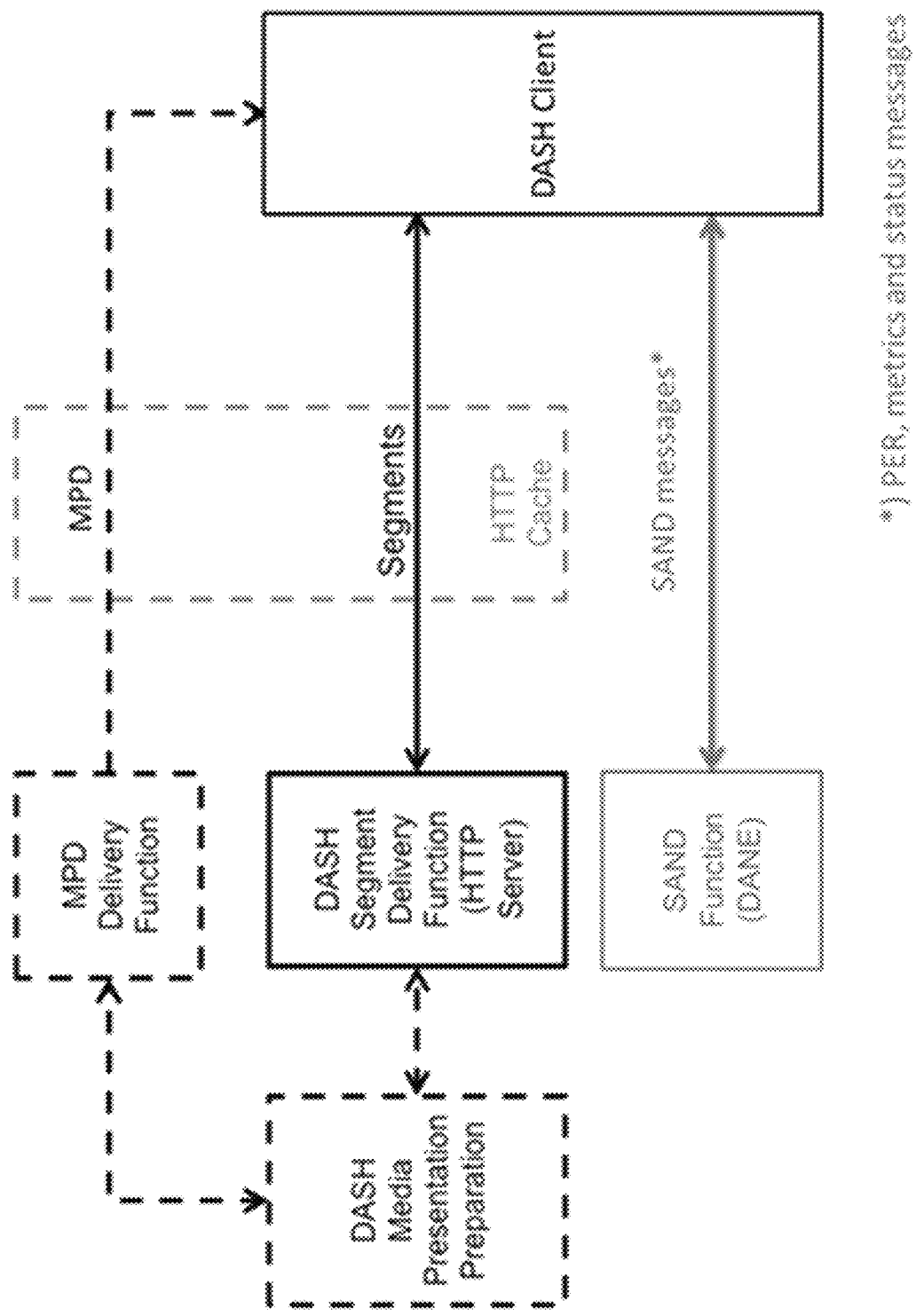
FIG. 8 illustrates a server and network assisted DASH (SAND)-augmented DASH architecture, in accordance with various embodiments.

SAND constitutes Part 5 of the MPEG DASH specifications, namely ISO/IEC 23009-5. SAND has reached FDIS stage within MPEG as of June 2016. SAND reference architecture is depicted in FIG. 8 (as shown in ISO/IEC 23009-5). SAND has also been adopted in 3GPP DASH as part of TS 26.247. Within this architecture, the following categories of messages, called SAND messages, are exchanged:

Parameters Enhancing Reception (PER) messages that are sent from DANEs to DASH clients, Status messages that are sent from DASH clients to DANEs.

Client Feedback Signalling of User-Selected Viewports over the Point Cloud

A new SAND status message 'SelectedViewport' can be specified in order to signal the user-selected viewports of the point cloud content at a specific time.

Depending on user's viewing devices, a viewport can be considered as a 3D spherical region or 2D planar region in the 3D space with 6 degrees of freedom (6 DoF), and hence 2D viewport or 3D viewport, respectively.

The Point Cloud user-selected 3D viewport indication signals the viewport with the sphere region as specified by syntax elements center_azimuth, center_elevation, center_tilt, azimuth_range, and elevation_range to indicate the spherical coordinate system (to cover rotational movements of the viewport), plus syntax elements center_x, center_y and center_z to indicate the x-y-z coordinates of the center point of the sphere that contains the viewport (to cover translational movements of the viewport).

The Point Cloud user-selected 2D viewport indication signals the viewport with the rectangular region as specified by syntax elements center_azimuth, center_elevation, center_tilt, width_range, and height_range to indicate the rectangular coordinate system (to cover planar movements of the viewport), plus syntax elements center_x, center_y and center_z to indicate the x-y-z coordinates of the center point of the sphere that contains the viewport (to cover translational movements of the viewport).

Moreover, it may be possible to indicate in the signaled viewport specific contextual information (e.g., the position of the ball, position of a star player, etc.) along with (or instead of) the coordinate-based description of the content coverage. One way to signal this information would be to define a string value to carry the relevant contextual information. Another option may be to signal an object_ID value, which refers to the specific point cloud object from which the viewport may be derived. Yet another option may be to signal a patch ID value, which refers to the specific point cloud patch from which the viewport may be derived. Object or patch ID information may be signalled in conjunction with the viewport coordinate information in order to provide more specifics about the x-y-z coordinates and spherical viewing position of the viewport.

i. Source and destination
   Type: Status
   Sender: DASH client
   Receiver: DANE
ii. Data representation

TABLE 2

SelectedViewport parameters

| Parameter | Type | Cardinality | Description |
|---|---|---|---|
| SelectedViewport | Object | 1 | |
| timestamp | date-time | 1 | Wall-clock time corresponding to the signaled viewport values |
| center_azimuth | Int: Range is $[-180 * 2^{-16}, 180 * 2^{-16}]$ | 1 | Specifies the azimuth of the centre point of the sphere region in units of $2^{-16}$ degrees relative to the global coordinate axes. When not present, center_azimuth is inferred to be equal to 0. |
| center_elevation | Int: Range is $[-90 * 2^{-16}, 90 * 2^{-16}]$ | 1 | Specifies the elevation of the centre point of the sphere region in units of $2^{-16}$ degrees relative to the global coordinate axes. When not present, center_elevation is inferred to be equal to 0. |
| center_tilt | Int: Range is $[-180 * 2^{-16}, 180 * 2^{-16}]$ | 1 | Specifies the tilt angle of the sphere region, in units of $2^{-16}$ degrees, relative to the global coordinate axes. When not present, center_tilt is inferred to be equal to 0. |
| azimuth_range | Int | 0, 1 | Specifies the azimuth range of the sphere region through the centre point of the sphere region in units of $2^{-16}$ degrees. When not present, azimuth_range is inferred to be equal to $360 * 2^{16}$. Only relevant for 3D viewports |
| elevation_range | Int | 0, 1 | Specifies the elevation range of the sphere region through the centre point of the sphere region in units of $2^{-16}$ degrees. When not present, elevation_range is inferred to be equal to $180 * 2^{16}$. Only relevant for 3D viewports |
| width_range | Int | 0, 1 | Specifies the width range of the rectangular region through its center point. Only relevant for 2D viewports |
| height_range | Int | 0, 1 | Specifies the height range of the rectangular region through its center point. Only relevant for 2D viewports |
| center_x | Int | 1 | Integer in decimal representation expressing the x-coordinate of the center point of the sphere containing the viewport in arbitrary units |
| center_y | Int | 1 | Integer in decimal representation expressing the y-coordinate of the center point of the sphere containing the viewport in arbitrary units |
| center_z | Int | 1 | Integer in decimal representation expressing the z-coordinate of the center point of the sphere containing the viewport in arbitrary units |
| object_id | Int | 1 | Integer expressing the object ID associated with the viewport. Object ID information may or may not be signalled in conjunction with the viewport coordinate information. |
| patch_id | Int | 1 | Integer expressing the patch ID associated with the viewport. Patch ID information may or may not be signalled in conjunction with the viewport coordinate information. |
| context | String | 1 | String describing the contextual information associated with the viewport, e.g., "ball", "player", etc. Context information may or may not be signalled in conjunction with the viewport coordinate information |

HTTP may be used as the transport protocol for carrying the above SAND status message. This does not preclude that other additional transport protocols could also be implemented, e.g., the use of the WebSocket protocol (IETF RFC 6455), as specified in clause 10 of ISO/IEC 23009-5. In particular, the newly defined SAND message could be carried as part of the HTTP header when requesting DASH segments using HTTP GET (as described in clause 8.2.3 of ISO/IEC 23009-5). Alternatively HTTP POST message could be used, and in this case the SAND message may be carried in the body of the HTTP POST message (as described in clause 8.2.2 of ISO/IEC 23009-5). In case of WebSocket, the newly defined SAND message may be transported over a WebSocket connection from the client to the network in a push-based manner.

Server Signaling of Signalling of Recommended Viewports over the Point Cloud to the Streaming Client A new SAND PER message 'RecommendedViewport' can be specified in order to signal the user-selected viewports of the point cloud content at a specific time.

The Point Cloud recommended 3D viewport indication signals the viewport with the sphere region as specified by syntax elements center_azimuth, center_elevation, center_tilt, azimuth_range, and elevation_range to indicate the spherical coordinate system (to cover rotational movements of the viewport), plus syntax elements center_x, center_y and center_z to indicate the x-y-z coordinates of the center point of the sphere that contains the viewport (to cover translational movements of the viewport).

The Point Cloud recommended 2D viewport indication signals the viewport with the rectangular region as specified by syntax elements center_azimuth, center_elevation, center_tilt, width_range, and height_range to indicate the rectangular coordinate system (to cover planar movements of the viewport), plus syntax elements center_x, center_y and center_z to indicate the x-y-z coordinates of the center point of the sphere that contains the viewport (to cover translational movements of the viewport).

Moreover, it may be possible to indicate in the signaled viewport specific contextual information (e.g., the position of the ball, position of a star player, etc.) along with (or instead of) the coordinate-based description of the content coverage. One way to signal this information would be to define a string value to carry the relevant contextual information. Another option may be to signal an object_ID value, which refers to the specific point cloud object from which the viewport may be derived. Yet another option may be to signal a patch ID value, which refers to the specific point cloud patch from which the viewport may be derived. Object or patch ID information may be signalled in conjunction with the viewport coordinate information in order to provide more specifics about the x-y-z coordinates and spherical viewing position of the viewport.

iii. Source and destination
    Type: PER
    Sender: DANE
    Receiver: DASH client
iv. Data representation

TABLE 3

RecommendedViewport parameters

| Parameter | Type | Cardinality | Description |
|---|---|---|---|
| RecommendedViewport | Object | 1 | |
| Timestamp | date-time | 1 | Wall-clock time corresponding to the signaled viewport values |
| center_azimuth | Int: Range is $[-180 * 2^{-16}, 180 * 2^{-16}]$ | 1 | Specifies the azimuth of the centre point of the sphere region in units of $2^{-16}$ degrees relative to the global coordinate axes. When not present, center_azimuth is inferred to be equal to 0. |
| center_elevation | Int: Range is $[-90 * 2^{-16}, 90 * 2^{-16}]$ | 1 | Specifies the elevation of the centre point of the sphere region in units of $2^{-16}$ degrees relative to the global coordinate axes. When not present, center_elevation is inferred to be equal to 0. |
| center_tilt | Int: Range is $[-180 * 2^{-16}, 180 * 2^{-16}]$ | 1 | Specifies the tilt angle of the sphere region, in units of $2^{-16}$ degrees, relative to the global coordinate axes. When not present, center_tilt is inferred to be equal to 0. |
| azimuth_range | Int | 1 | Specifies the azimuth range of the sphere region through the centre point of the sphere region in units of $2^{-16}$ degrees. When not present, azimuth_range is inferred to be equal to $360 * 2^{16}$. Only relevant for 3D viewports |
| elevation_range | Int | 1 | Specifies the elevation range of the sphere region through the centre point of the sphere region in units of $2^{-16}$ degrees. When not present, elevation_range is inferred to be equal to $180 * 2^{16}$. Only relevant for 3D viewports |
| width_range | Int | 0, 1 | Specifies the width range of the rectangular region through its center point. Only relevant for 2D viewports |
| height_range | Int | 0, 1 | Specifies the height range of the rectangular region through its center point. Only relevant for 2D viewports |
| center_x | Int | 1 | Integer in decimal representation expressing the x-coordinate of the center point of the sphere containing the viewport in arbitrary units |

TABLE 3-continued

Recommended Viewport parameters

| Parameter | Type | Cardinality | Description |
| --- | --- | --- | --- |
| center_y | Int | 1 | Integer in decimal representation expressing the y-coordinate of the center point of the sphere containing the viewport in arbitrary units |
| center_z | Int | 1 | Integer in decimal representation expressing the z-coordinate of the center point of the sphere containing the viewport in arbitrary units |
| object_id | Int | 1 | Integer expressing the object ID associated with the viewport. Object ID information may or may not be signalled in conjunction with the viewport coordinate information. |
| patch_id | Int | 1 | Integer expressing the patch ID associated with the viewport. Patch ID information may or may not be signalled in conjunction with the viewport coordinate information. |
| Context | String | 1 | String describing the contextual information associated with the viewport, e.g., "ball", "player", etc. Context information may or may not be signalled in conjunction with the viewport coordinate information |

HTTP may be used as the transport protocol for carrying the above SAND PER message. This does not preclude that other additional transport protocols could also be implemented, e.g., the use of the WebSocket protocol (IETF RFC 6455), as specified in clause 10 of ISO/IEC 23009-5. In particular, DASH client may explicitly request the newly defined SAND message from the server (DANE) using an HTTP GET message (as described in clause 8.3 of ISO/IEC 23009-5). In case of WebSocket, the newly defined SAND message may be transported over a WebSocket connection from the client to the network in a push-based manner without requiring the client to continuously poll the DANE to request the updated recommended viewport information.

The recommended viewport information may also be sent from the network to the client as part of a timed metadata track contained in an ISOBMFF file. In this case, the recommended viewport may be announced over the MPD/manifest.

Systems and Implementations

Figure 11:
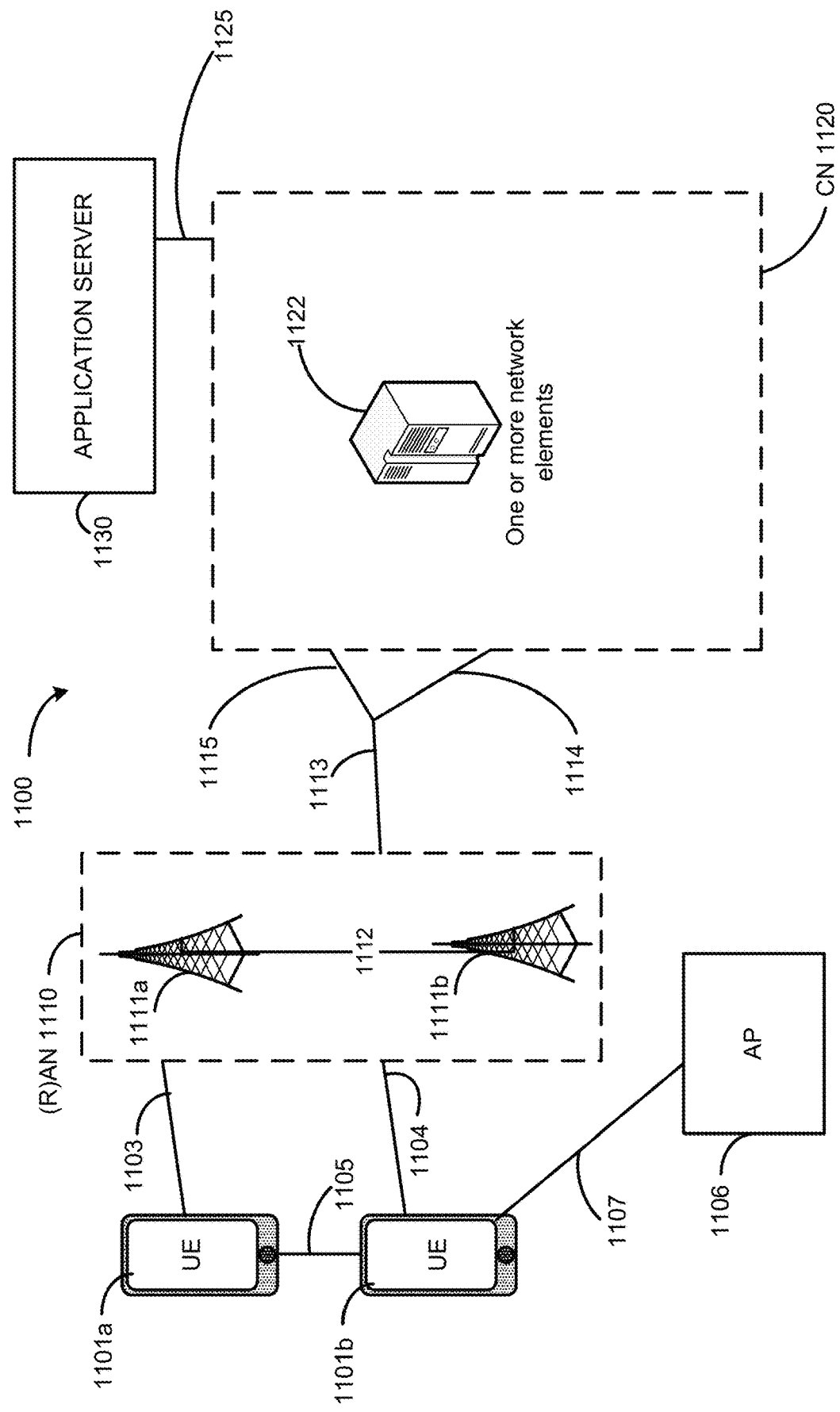
FIG. 11 illustrates an example architecture of a system of a network, in accordance with various embodiments.

FIG. 11 illustrates an example architecture of a system 1100 of a network, in accordance with various embodiments. The following description is provided for an example system 1100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 11, the system 1100 includes UE 1101a and UE 1101b (collectively referred to as "UEs 1101" or "UE 1101"). In this example, UEs 1101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 may be configured to connect, for example, communicatively couple, with an or RAN 1110. In embodiments, the RAN 1110 may be an NG RAN or a 5G RAN, an E-UTRAN, or a legacy RAN, such as a UTRAN or GERAN. As used herein, the term "NG RAN" or the like may refer to a RAN 1110 that operates in an NR or 5G system 1100, and the term "E-UTRAN" or the like may refer to a RAN 1110 that operates in an LTE or 4G system 1100. The UEs 1101 utilize connections (or channels) 1103 and 1104, respectively, each of which comprises a physical communications interface or layer (discussed in further detail below).

In this example, the connections 1103 and 1104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 1101 may directly exchange communication data via a ProSe interface 1105. The ProSe interface 1105 may alternatively be referred to as a SL interface 1105 and may comprise one or more logical channels, including but not limited to a PSCCH, a PSSCH, a PSDCH, and a PSBCH.

The UE 1101b is shown to be configured to access an AP 1106 (also referred to as "WLAN node 1106," "WLAN 1106," "WLAN Termination 1106," "WT 1106" or the like) via connection 1107. The connection 1107 can comprise a local wireless connection, such as a connection consistent with any IEEE 802.11 protocol, wherein the AP 1106 would comprise a wireless fidelity (Wi-Fi®) router. In this example, the AP 1106 is shown to be connected to the Internet without connecting to the core network of the wireless system (described in further detail below). In various embodiments, the UE 1101b, RAN 1110, and AP 1106 may be configured to utilize LWA operation and/or LWIP operation. The LWA operation may involve the UE 1101b in RRC CONNECTED being configured by a RAN node 1111a-b to utilize radio resources of LTE and WLAN. LWIP operation may involve the UE 1101b using WLAN radio resources (e.g., connection 1107) via IPsec protocol tunneling to authenticate and encrypt packets (e.g., IP packets) sent over the connection 1107. IPsec tunneling may include encapsulating the entirety of original IP packets and adding a new packet header, thereby protecting the original header of the IP packets.

The RAN 1110 can include one or more AN nodes or RAN nodes 1111a and 1111b (collectively referred to as "RAN nodes 1111" or "RAN node 1111") that enable the connections 1103 and 1104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1111 that operates in an NR or 5G system 1100 (for example, a gNB), and the term "E-UTRAN node" or the like may refer to a RAN node 1111 that operates in an LTE or 4G system 1100 (e.g., an eNB). According to various embodiments, the RAN nodes 1111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 1111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1111; a MAC/PHY split wherein RRC, PDCP, RLC, and MAC layers are operated by the CRAN/vBBUP and the PHY layer is operated by individual RAN nodes 1111; or a "lower PHY" split wherein RRC, PDCP, RLC, MAC layers and upper portions of the PHY layer are operated by the CRAN/vBBUP and lower portions of the PHY layer are operated by individual RAN nodes 1111. This virtualized framework allows the freed-up processor cores of the RAN nodes 1111 to perform other virtualized applications. In some implementations, an individual RAN node 1111 may represent individual gNB-DUs that are connected to a gNB-CU via individual F1 interfaces (not shown by FIG. 11). In these implementations, the gNB-DUs may include one or more remote radio heads or RFEMs (see, e.g., FIG. 12), and the gNB-CU may be operated by a server that is located in the RAN 1110 (not shown) or by a server pool in a similar manner as the CRAN/vBBUP. Additionally or alternatively, one or more of the RAN nodes 1111 may be next generation eNBs (ng-eNBs), which are RAN nodes that provide E-UTRA user plane and control plane protocol terminations toward the UEs 1101, and are connected to a 5GC (e.g., CN XR220 of Figure XR2) via an NG interface (discussed infra).

In V2X scenarios one or more of the RAN nodes 1111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1101 (vUEs 1101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1111 can terminate the air interface protocol and can be the first point of contact for the UEs 1101. In some embodiments, any of the RAN nodes 1111 can fulfill various logical functions for the RAN 1110 including, but not limited to, radio network controller (RNC) functions such as radio bearer management, uplink and downlink dynamic radio resource management and data packet scheduling, and mobility management.

In embodiments, the UEs 1101 can be configured to communicate using OFDM communication signals with each other or with any of the RAN nodes 1111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 to the UEs 1101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1101 and the RAN nodes 1111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 1101 and the RAN nodes 1111 may operate using LAA, eLAA, and/or feLAA mechanisms. In these implementations, the UEs 1101 and the RAN nodes 1111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1101 RAN nodes 1111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1101, AP 1106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (p); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1101. The PDCCH carries information about the transport format and resource allocations related to the PDSCH channel, among other things. It may also inform the UEs 1101 about the transport format, resource allocation, and HARQ information related to the uplink shared channel. Typically, downlink scheduling (assigning control and shared channel resource blocks to the UE 1101b within a cell) may be performed at any of the RAN nodes 1111 based on channel quality information fed back from any of the UEs 1101. The downlink resource assignment information may be sent on the PDCCH used for (e.g., assigned to) each of the UEs 1101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition.

There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 1111 may be configured to communicate with one another via interface 1112. In embodiments where the system 1100 is an LTE system (e.g., when CN 1120 is an EPC), the interface 1112 may be an X2 interface 1112. The X2 interface may be defined between two or more RAN nodes 1111 (e.g., two or more eNBs and the like) that connect to EPC 1120, and/or between two eNBs connecting to EPC 1120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1101 from an SeNB for user data; information of PDCP PDUs that were not delivered to a UE 1101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1100 is a 5G or NR system (e.g., when CN 1120 is a 5GC), the interface 1112 may be an Xn interface 1112. The Xn interface is defined between two or more RAN nodes 1111 (e.g., two or more gNBs and the like) that connect to 5GC 1120, between a RAN node 1111 (e.g., a gNB) connecting to 5GC 1120 and an eNB, and/or between two eNBs connecting to 5GC 1120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1101 in a connected mode (e.g., CM-CONNECTED) including functionality to manage the UE mobility for connected mode between one or more RAN nodes 1111. The mobility support may include context transfer from an old (source) serving RAN node 1111 to new (target) serving RAN node 1111; and control of user plane tunnels between old (source) serving RAN node 1111 to new (target) serving RAN node 1111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1110 is shown to be communicatively coupled to a core network—in this embodiment, core network (CN) 1120. The CN 1120 may comprise a plurality of network elements 1122, which are configured to offer various data and telecommunications services to customers/subscribers (e.g., users of UEs 1101) who are connected to the CN 1120 via the RAN 1110. The components of the CN 1120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1120 may be referred to as a network slice, and a logical instantiation of a portion of the CN 1120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1130 may be an element offering applications that use IP bearer resources with the core network (e.g., UMTS PS domain, LTE PS data services, etc.). The application server 1130 can also be configured to support one or more communication services (e.g., VoIP sessions, PTT sessions, group communication sessions, social networking services, etc.) for the UEs 1101 via the EPC 1120.

In embodiments, the CN 1120 may be a 5GC (referred to as "5GC 1120" or the like), and the RAN 1110 may be connected with the CN 1120 via an NG interface 1113. In embodiments, the NG interface 1113 may be split into two parts, an NG user plane (NG-U) interface 1114, which carries traffic data between the RAN nodes 1111 and a UPF, and the S1 control plane (NG-C) interface 1115, which is a signaling interface between the RAN nodes 1111 and AMFs.

In embodiments, the CN 1120 may be a 5G CN (referred to as "5GC 1120" or the like), while in other embodiments, the CN 1120 may be an EPC). Where CN 1120 is an EPC (referred to as "EPC 1120" or the like), the RAN 1110 may be connected with the CN 1120 via an Si interface 1113. In embodiments, the S1 interface 1113 may be split into two parts, an S1 user plane (S1-U) interface 1114, which carries traffic data between the RAN nodes 1111 and the S-GW, and the S1-MME interface 1115, which is a signaling interface between the RAN nodes 1111 and MMES.

Figure 12:
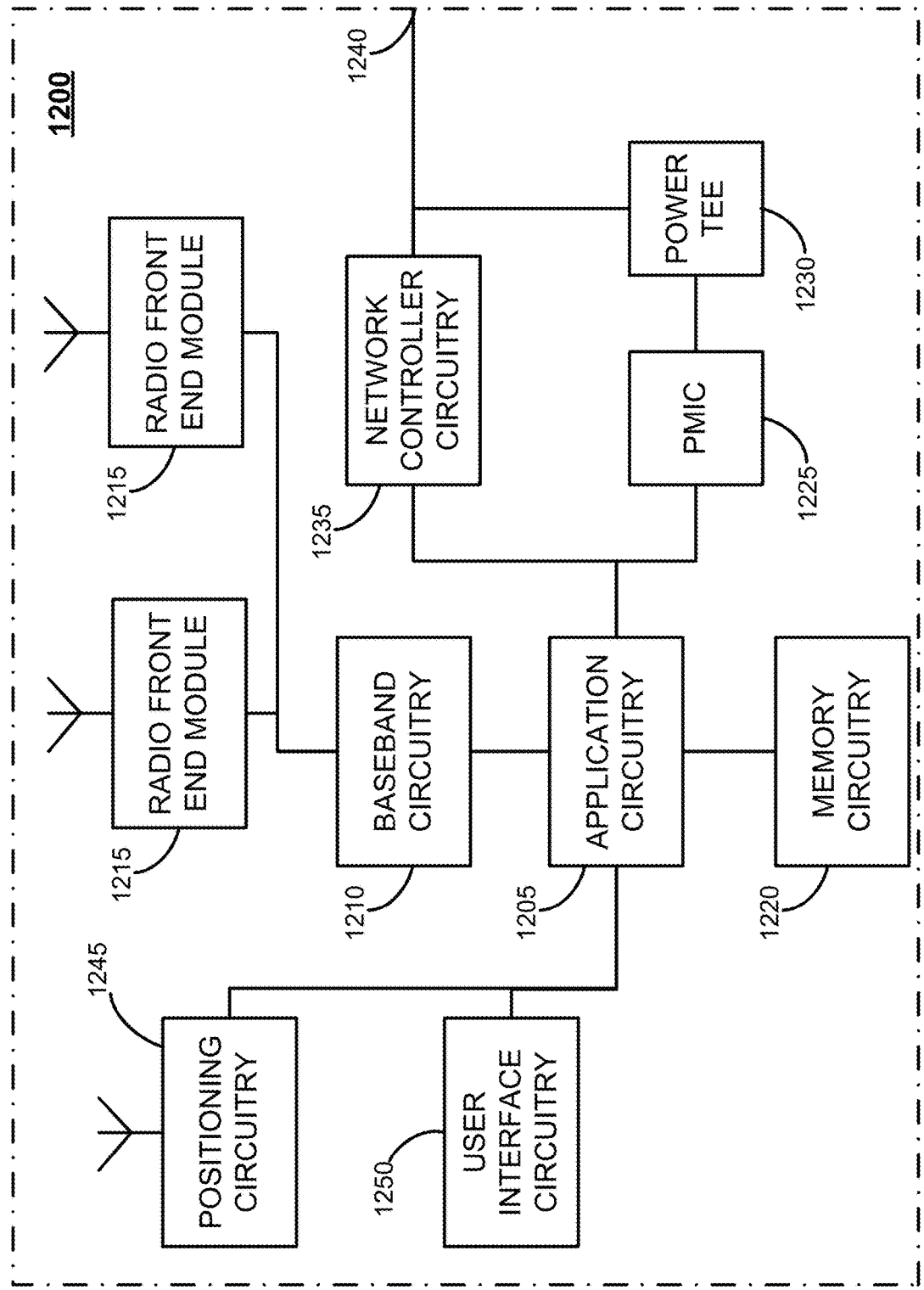
FIG. 12 illustrates an example of infrastructure equipment in accordance with various embodiments.

FIG. 12 illustrates an example of infrastructure equipment 1200 in accordance with various embodiments. The infrastructure equipment 1200 (or "system 1200") may be implemented as a base station, radio head, RAN node such as the RAN nodes 1111 and/or AP 1106 shown and described previously, application server(s) 1130, and/or any other element/device discussed herein. In other examples, the system 1200 could be implemented in or by a UE.

The system 1200 includes application circuitry 1205, baseband circuitry 1210, one or more radio front end modules (RFEMs) 1215, memory circuitry 1220, power management integrated circuitry (PMIC) 1225, power tee circuitry 1230, network controller circuitry 1235, network interface connector 1240, satellite positioning circuitry 1245, and user interface 1250. In some embodiments, the device 1200 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1205 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1205 may be coupled with or may include memory/storage elements and may be configured to execute instructions stored in the memory/storage to enable various applications or operating systems to run on the system 1200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1205 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1205 may comprise, or may be, a special-purpose processor/controller to operate according to the various embodiments herein. As examples, the processor(s) of application circuitry 1205 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium(™), Inc.; a MIPS-based design from MIPS Technologies, Inc. such as MIPS Warrior P-class processors; and/or the like. In some embodiments, the system 1200 may not utilize application circuitry 1205, and instead may include a special-purpose processor/controller to process IP data received from an EPC or SGC, for example.

In some implementations, the application circuitry 1205 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1205 may comprise logic blocks or logic fabric, and other interconnected resources that may be programmed to perform various functions, such as the procedures, methods, functions, etc. of the various embodiments discussed herein. In such embodiments, the circuitry of application circuitry 1205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1210 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1210 are discussed infra with regard to FIG. 14.

User interface circuitry 1250 may include one or more user interfaces designed to enable user interaction with the system 1200 or peripheral component interfaces designed to enable peripheral component interaction with the system 1200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1411 of FIG. 14 infra), and the RFEM may be connected to multiple antennas. In alternative implementations, both mmWave and sub-mmWave radio functions may be implemented in the same physical RFEM 1215, which incorporates both mmWave antennas and sub-mmWave.

The memory circuitry 1220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1220 may be implemented as one or more of solder down packaged integrated circuits, socketed memory modules and plug-in memory cards.

The PMIC 1225 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1230 may provide for electrical power drawn from a network cable to provide both power supply and data connectivity to the infrastructure equipment 1200 using a single cable.

The network controller circuitry 1235 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1200 via network interface connector 1240 using a physical connection, which may be electrical (commonly referred to as a "copper interconnect"), optical, or wireless. The network controller circuitry 1235 may include one or more dedicated processors and/or FPGAs to communicate using one or more of the aforementioned protocols. In some implementations, the network controller circuitry 1235 may include multiple controllers to provide connectivity to other networks using the same or different protocols.

The positioning circuitry 1245 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1245 may include a Micro-Technology for Positioning, Navigation, and Timing (Micro-PNT) IC that uses a master timing clock to perform position tracking/estimation without GNSS assistance. The positioning circuitry 1245 may also be part of, or interact with, the baseband circuitry 1210 and/or RFEMs 1215 to communicate with the nodes and components of the positioning network. The positioning circuitry 1245 may also provide position data and/or time data to the application circuitry 1205, which may use the data to synchronize operations with various infrastructure (e.g., RAN nodes 1111, etc.), or the like.

The components shown by FIG. 12 may communicate with one another using interface circuitry, which may include any number of bus and/or IX technologies such as ISA, extended ISA, I2C, SPI, point-to-point interfaces, power management bus (PMBus), PCI, PCIe, PCIx, Intel® UPI, Intel® Accelerator Link, Intel® CXL, CAPI, Open-CAPI, Intel® QPI, UPI, Intel® OPA IX, RapidIO™ system IXs, CCIX, Gen-Z Consortium IXs, a HyperTransport interconnect, NVLink provided by NVIDIA®, and/or any number of other IX technologies. The IX technology may be a proprietary bus, for example, used in an SoC based system.

Figure 13:
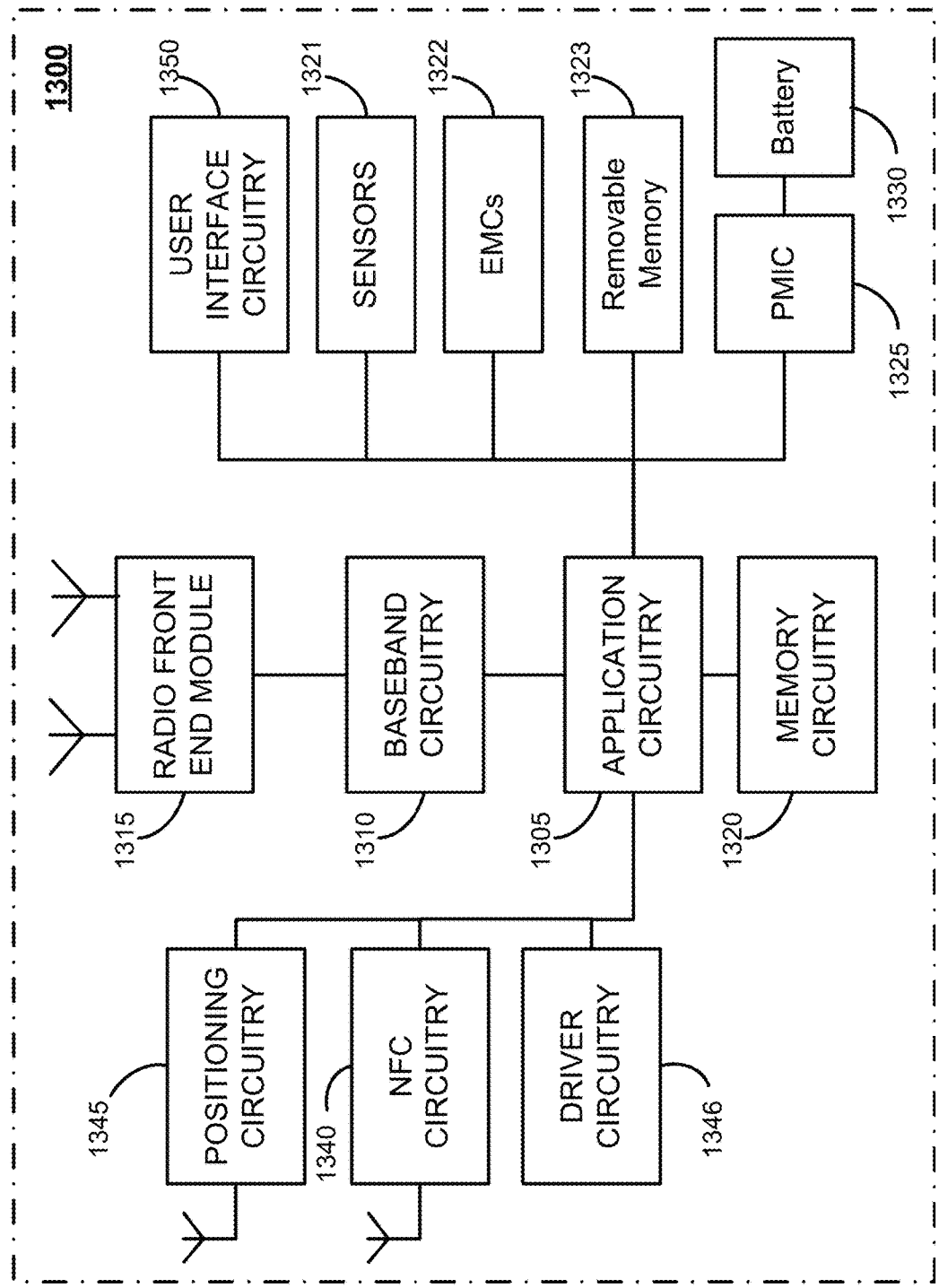
FIG. 13 illustrates an example of a computer platform in accordance with various embodiments.

FIG. 13 illustrates an example of a platform 1300 (or "device 1300") in accordance with various embodiments. In embodiments, the computer platform 1300 may be suitable for use as UEs 1101, XR101, XR201, application servers 1130, and/or any other element/device discussed herein. The platform 1300 may include any combinations of the components shown in the example. The components of platform 1300 may be implemented as integrated circuits (ICs), portions thereof, discrete electronic devices, or other modules, logic, hardware, software, firmware, or a combination thereof adapted in the computer platform 1300, or as components otherwise incorporated within a chassis of a larger system. The block diagram of FIG. 13 is intended to show a high level view of components of the computer platform 1300. However, some of the components shown may be omitted, additional components may be present, and different arrangement of the components shown may occur in other implementations.

Application circuitry 1305 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1305 may be coupled with or may include memory/storage elements and may be configured to execute instructions stored in the memory/storage to enable various applications or operating systems to run on the system 1300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1205 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1205 may comprise, or may be, a special-purpose processor/controller to operate according to the various embodiments herein.

As examples, the processor(s) of application circuitry 1305 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 1305 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1305 may be a part of a system on a chip (SoC) in which the application circuitry 1305 and other components are formed into a single integrated circuit, or a single package, such as the Edison™ or Galileo™ SoC boards from Intel® Corporation.

Additionally or alternatively, application circuitry 1305 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1305 may comprise logic blocks or logic fabric, and other interconnected resources that may be programmed to perform various functions, such as the procedures, methods, functions, etc. of the various embodiments discussed herein. In such embodiments, the circuitry of application circuitry 1305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1310 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1310 are discussed infra with regard to FIG. 14.

The RFEMs 1315 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1411 of FIG. 14 infra), and the RFEM may be connected to multiple antennas. In alternative implementations, both mmWave and sub-mmWave radio functions may be implemented in the same physical RFEM 1315, which incorporates both mmWave antennas and sub-mmWave.

The memory circuitry 1320 may include any number and type of memory devices used to provide for a given amount of system memory. As examples, the memory circuitry 1320 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1320 may be developed in accordance with a Joint Electron Devices Engineering Council (JEDEC) low power double data rate (LPDDR)-based design, such as LPDDR2, LPDDR3, LPDDR4, or the like. Memory circuitry 1320 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1320 may be on-die memory or registers associated with the application circuitry 1305. To provide for persistent storage of information such as data, applications, operating systems and so forth, memory circuitry 1320 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1300 may incorporate the three-dimensional (3D) cross-point (XPOINT) memories from Intel® and Micron®.

Removable memory circuitry 1323 may include devices, circuitry, enclosures/housings, ports or receptacles, etc. used to couple portable data storage devices with the platform 1300. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1300 may also include interface circuitry (not shown) that is used to connect external devices with the platform 1300. The external devices connected to the platform 1300 via the interface circuitry include sensor circuitry 1321 and electro-mechanical components (EMCs) 1322, as well as removable memory devices coupled to removable memory circuitry 1323.

The sensor circuitry 1321 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1322 include devices, modules, or subsystems whose purpose is to enable platform 1300 to change its state, position, and/or orientation, or move or control a mechanism or (sub)system. Additionally, EMCs 1322 may be configured to generate and send messages/signalling to other components of the platform 1300 to indicate a current state of the EMCs 1322. Examples of the EMCs 1322 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1300 is configured to operate one or more EMCs 1322 based on one or more captured events and/or instructions or control signals received from a service provider and/or various clients.

In some implementations, the interface circuitry may connect the platform 1300 with positioning circuitry 1345. The positioning circuitry 1345 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1345 may include a Micro-PNT IC that uses a master timing clock to perform position tracking/estimation without GNSS assistance. The positioning circuitry 1345 may also be part of, or interact with, the baseband circuitry 1210 and/or RFEMs 1315 to communicate with the nodes and components of the positioning network. The positioning circuitry 1345 may also provide position data and/or time data to the application circuitry 1305, which may use the data to synchronize operations with various infrastructure (e.g., radio base stations), for turn-by-turn navigation applications, or the like In some implementations, the interface circuitry may connect the platform 1300 with Near-Field Communication (NFC) circuitry 1340. NFC circuitry 1340 is configured to provide contactless, short-range communications based on radio frequency identification (RFID) standards, wherein magnetic field induction is used to enable communication between NFC circuitry 1340 and NFC-enabled devices external to the platform 1300 (e.g., an "NFC touchpoint"). NFC circuitry 1340 comprises an NFC controller coupled with an antenna element and a processor coupled with the NFC controller. The NFC controller may be a chip/IC providing NFC functionalities to the NFC circuitry 1340 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1340, or initiate data transfer between the NFC circuitry 1340 and another active NFC device (e.g., a smartphone or an NFC-enabled POS terminal) that is proximate to the platform 1300.

The driver circuitry 1346 may include software and hardware elements that operate to control particular devices that are embedded in the platform 1300, attached to the platform 1300, or otherwise communicatively coupled with the platform 1300. The driver circuitry 1346 may include individual drivers allowing other components of the platform 1300 to interact with or control various input/output (I/O) devices that may be present within, or connected to, the platform 1300. For example, driver circuitry 1346 may include a display driver to control and allow access to a display device, a touchscreen driver to control and allow access to a touchscreen interface of the platform 1300, sensor drivers to obtain sensor readings of sensor circuitry 1321 and control and allow access to sensor circuitry 1321, EMC drivers to obtain actuator positions of the EMCs 1322 and/or control and allow access to the EMCs 1322, a camera driver to control and allow access to an embedded image capture device, audio drivers to control and allow access to one or more audio devices.

The power management integrated circuitry (PMIC) 1325 (also referred to as "power management circuitry 1325") may manage power provided to various components of the platform 1300. In particular, with respect to the baseband circuitry 1310, the PMIC 1325 may control power-source selection, voltage scaling, battery charging, or DC-to-DC conversion. The PMIC 1325 may often be included when the platform 1300 is capable of being powered by a battery 1330, for example, when the device is included in a UE 1101, XR101, XR201.

In some embodiments, the PMIC 1325 may control, or otherwise be part of, various power saving mechanisms of the platform 1300. For example, if the platform 1300 is in an RRC_Connected state, where it is still connected to the RAN node as it expects to receive traffic shortly, then it may enter a state known as Discontinuous Reception Mode (DRX) after a period of inactivity. During this state, the platform 1300 may power down for brief intervals of time and thus save power. If there is no data traffic activity for an extended period of time, then the platform 1300 may transition off to an RRC_Idle state, where it disconnects from the network and does not perform operations such as channel quality feedback, handover, etc. The platform 1300 goes into a very low power state and it performs paging where again it periodically wakes up to listen to the network and then powers down again. The platform 1300 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1330 may power the platform 1300, although in some examples the platform 1300 may be mounted deployed in a fixed location, and may have a power supply coupled to an electrical grid. The battery 1330 may be a lithium ion battery, a metal-air battery, such as a zinc-air battery, an aluminum-air battery, a lithium-air battery, and the like. In some implementations, such as in V2X applications, the battery 1330 may be a typical lead-acid automotive battery.

In some implementations, the battery 1330 may be a "smart battery," which includes or is coupled with a Battery Management System (BMS) or battery monitoring integrated circuitry. The BMS may be included in the platform 1300 to track the state of charge (SoCh) of the battery 1330. The BMS may be used to monitor other parameters of the battery 1330 to provide failure predictions, such as the state of health (SoH) and the state of function (SoF) of the battery 1330. The BMS may communicate the information of the battery 1330 to the application circuitry 1305 or other components of the platform 1300. The BMS may also include an analog-to-digital (ADC) convertor that allows the application circuitry 1305 to directly monitor the voltage of the battery 1330 or the current flow from the battery 1330. The battery parameters may be used to determine actions that the platform 1300 may perform, such as transmission frequency, network operation, sensing frequency, and the like.

A power block, or other power supply coupled to an electrical grid may be coupled with the BMS to charge the battery 1330. In some examples, the power block XS30 may be replaced with a wireless power receiver to obtain the power wirelessly, for example, through a loop antenna in the computer platform 1300. In these examples, a wireless battery charging circuit may be included in the BMS. The specific charging circuits chosen may depend on the size of the battery 1330, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1350 includes various input/output (I/O) devices present within, or connected to, the platform 1300, and includes one or more user interfaces designed to enable user interaction with the platform 1300 and/or peripheral component interfaces designed to enable peripheral component interaction with the platform 1300. The user interface circuitry 1350 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1300. The output device circuitry may also include speakers or other audio emitting devices, printer(s), and/or the like. In some embodiments, the sensor circuitry 1321 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1300 may communicate with one another using a suitable bus or interconnect (IX) technology, which may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX 1306 may be a proprietary bus, for example, used in a SoC based system.

According to various embodiments, the various components of the system 1300 may implement an MTSI client in terminal using 3GPP access. The MTSI client in terminal may include speech decoder and/or encoder circuitry, video decoder and/or encoder circuitry, text decoder and/or encoder circuitry, session setup and control circuitry, and a packet-based network interface. The packet-based network interface handles the transport of media, which includes the encapsulation of the coded media in a transport protocol as well as handling of coded media received from the network. The packet-based network interface interfaces with 3GPP L2 for the transport of media and control data. The various decoder and/or encoder circuitries interface with the user interface circuitry 1350 to obtain media data to be encoded for transmission, and to provide decoded media data to the user interface circuitry 1350 to be output. The various decoder and/or encoder circuitries interface with the packet-based network interface to obtain respective encoded media data to be decoded. General control-related elements of an MTSI client for conversational media, such as SIP signaling, are handled by the session setup handling and session control circuitry. These control-related elements include, for example, usage of SDP (see e.g., RFC 4566) and SDPCap-Neg in SIP invitations for capability negotiation and media stream setup, set-up and control of the individual media streams between clients, and interactivity such as adding and dropping of media components.

Various combinations of the components of the system 1300 may implement the elements of the MTSI client in terminal. In one example, all of the MTSI client in terminal elements may be implemented in the baseband circuitry 1310. In a second example, the application circuitry 1305 may implement the speech decoder and/or encoder circuitry, video decoder and/or encoder circuitry, text decoder and/or encoder circuitry, and the session setup and control circuitry; and the packet-based network interface may be implemented by the baseband circuitry 1310.

The Multimedia Telephony Service for IMS supports simultaneous transfer of multiple media components with real-time characteristics. Media components denote the actual components that the end-user experiences. Multiple media components (including media components of the same media type) may be present in a session, where at least one of these components is present in all conversational multimedia telephony sessions. All media components can be added or dropped during an ongoing session as required either by the end-user or by controlling nodes in the network, assuming that when adding components, the capabilities of the MTSI client support the additional component. The media components may include core media components including, for example, speech (e.g., the sound that is picked up by a microphone of a first terminal (e.g., UE 1101*a*), transferred from the first terminal to a second terminal (e.g., UE 1101*b*), and played out in an earphone/loudspeaker of the second terminal; speech includes detection, transport and generation of DTMF events), video (e.g., moving image(s) captured by a camera of a first terminal (e.g., UE 1101*a*), transmitted to a second terminal (e.g., UE 1101*b*), and rendered on a display of the second terminal), and text (e.g., characters typed on a keyboard or drawn on a screen on a first terminal (e.g., UE 1101*a*) and rendered in real time on the display of a second terminal (e.g., UE 1101*b*); the flow is time-sampled so that no specific action is needed from the user to request transmission). For the purposes of the present disclosure, the terms "voice," "speech," and "audio" may be synonymous and used interchangeably. The aforementioned media components may be transported in real time over RTP with each respective payload format mapped onto one or more RTP streams (see e.g., IETF RFC 3550). Other media types than those mentioned previously may be included in a session, for example, facsimile (fax) transmission data and non-conversational media such as IMS messaging (see e.g., 3GPP TS 24.247).

The MTSI client specifies various media codecs for individual media components. A "codec" refers to program code or process/procedure for encoding or decoding a digital data stream or signal. Examples of the codecs that may be used include AMR (see e.g., 3GPP TS 26.071) including AMR-NB, AMR-WB, and EVS AMR-WB IO (i.e., AMR-WB IO included in the EVS codec); EVS; DSR Extended Advanced Front-end codec; DTMF codecs; H.224; H.281; H.263; H.264 (MPEG-4/AVC); H.265 (HEVC); H.324 and/or 3G-324M; EVRC including EVRC-WB; G.729-based codecs including CS-ACELP codecs, the G.729.1 Audio Codec; ITU-T Recommendation T.140 codecs (including presentation control functions from ISO 6429); and/or other like codecs.

In various embodiments, the application circuitry 1305 and/or the baseband circuitry 1310 may implement JBM circuitry. JBM denotes the actual buffer as well as any control, adaptation and media processing algorithm (excluding speech decoder) used in the management of the jitter induced in a transport channel. In some implementations, the JBM circuitry of an MTSI client with an adaptive jitter buffer may include a jitter buffer, network analyzer, adaption control logic, a decoder, and an adaptation unit. The network analyzer and the adaptation control logic, together with the information on buffer status form the actual buffer, control the JBM functionality, whereas the decoder and the adaptation unit provide the media processing functionality.

In these implementations, the jitter buffer is configured to unpack incoming RTP payloads and to store received media frames (e.g., speech or video). The buffer status may be used as input to the adaptation control logic. Furthermore, the buffer is also linked to the decoder to provide frames for decoding when requested for decoding by the decoder. The decoder may be the same or similar to the decoder circuitry mentioned previously. For example, the decoder may be a speech decoder implementing standard AMR, AMR-WB, and/or EVS speech codecs. In some implementations, the decoder may include error concealment and/or bad frame handling functionality. The decoder may be used with or without the adaptation unit. The network analyzer is configured to monitor the incoming packet stream and to collect reception statistics (e.g., jitter, packet loss) that are needed for jitter buffer adaptation. In implementations where RTCP is used, the network analyzer is also configured to maintain statistics required by the RTCP.

The adaptation control logic (also referred to as "buffer control logic") is configured to adjust playback delay, and the operation of the adaptation functionality makes decisions on the buffering delay adjustments and required media adaptation actions based on the buffer status (e.g., average buffering delay, buffer occupancy, etc.) and input from the network analyzer. External control input, including RTCP inputs/statistics from the sender, can be used, for example, to enable inter-media synchronization, to adapt the jitter buffer, and/or other external scaling requests. In these cases, the adaptation control logic provides scaling requests and scaling window information to the adaptation unit. The adaptation control logic may utilize different adaptation strategies such as fixed jitter buffer (without adaptation and time scaling), simple adaptation during comfort noise periods or buffer adaptation also during active speech. The general operation is controlled with desired proportion of frames arriving late, adaptation strategy and adaptation rate.

The adaptation unit is configured to shorten or extend the output signal length according to requests given by the adaptation control logic to enable buffer delay adjustment in a transparent manner. The adaptation is performed using the frame based or sample based time scaling on the decoder output signal during comfort noise periods only or during active speech and comfort noise. The buffer control logic may have a mechanism to limit the maximum scaling ratio. Providing a scaling window in which the targeted time scale modifications are performed improves the situation in certain scenarios (e.g., when reacting to the clock drift or to a request of inter-media (re)synchronization) by allowing flexibility in allocating the scaling request on several frames and performing the scaling on a content-aware manner. The adaptation unit may be implemented either in a separate entity from the decoder or embedded within the decoder.

Speech JBM used in MTSI may support source-controlled rate operation as well as non-source-controlled rate operation; is capable to receive the de-packetized frames out of order and present them in order for decoder consumption; is capable to receive duplicate speech frames and only present unique speech frames for decoder consumption; and is capable of handling clock drift between the encoding and decoding end-points. JBM may also be used for video frames/data wherein the overall design of the buffer may aim to minimize delay, maintain synchronization with speech, and minimize dropping of late packets. In some implementations, JBM for text may not be needed, but may still be used according to section 5 of RFC 4103 where a calculation is described for the time allowed before an extra delayed text packet may be regarded to be lost.

Figure 14:
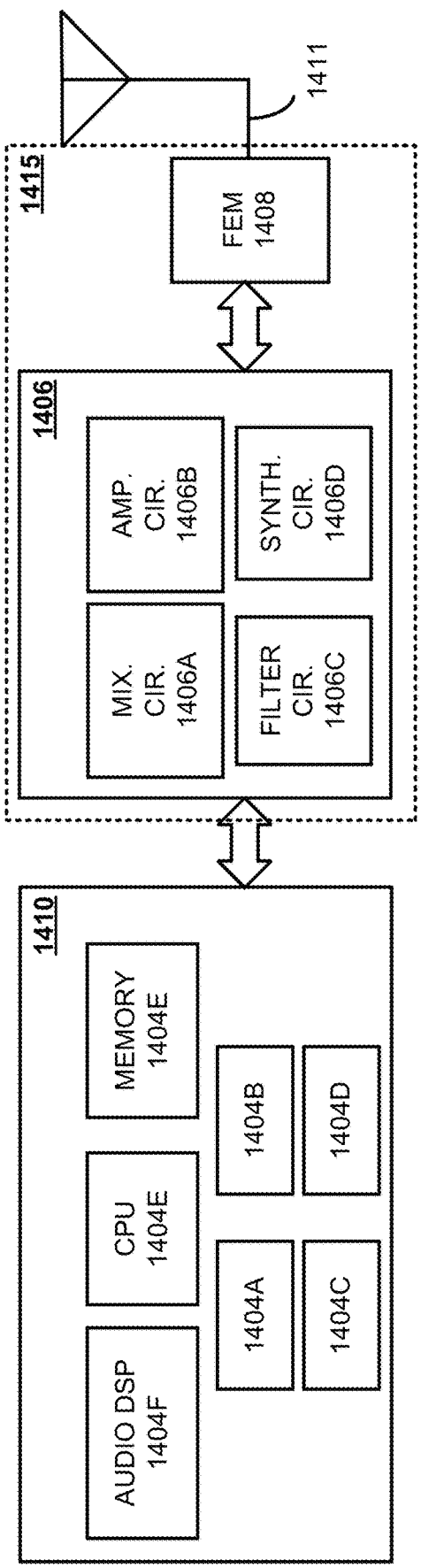
FIG. 14 illustrates example components of baseband circuitry and radio front end modules in accordance with various embodiments.

FIG. 14 illustrates example components of baseband circuitry 1410 and radio front end modules (RFEM) 1415 in accordance with various embodiments. The baseband circuitry 1410 corresponds to the baseband circuitry 1210 and 1310 of FIGS. 12 and 13, respectively. The RFEM 1415 corresponds to the RFEM 1215 and 1315 of FIGS. 12 and 13, respectively. As shown, the RFEMs 1415 may include Radio Frequency (RF) circuitry 1406, front-end module (FEM) circuitry 1408, antenna array 1411 coupled together at least as shown.

The baseband circuitry 1410 includes circuitry and/or control logic configured to carry out various radio/network protocol and radio control functions that enable communication with one or more radio networks via the RF circuitry 1406. The radio control functions may include, but are not limited to, signal modulation/demodulation, encoding/decoding, radio frequency shifting, etc. In some embodiments, modulation/demodulation circuitry of the baseband circuitry 1410 may include Fast-Fourier Transform (FFT), precoding, or constellation mapping/demapping functionality. In some embodiments, encoding/decoding circuitry of the baseband circuitry 1410 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1410 is configured to process baseband signals received from a receive signal path of the RF circuitry 1406 and to generate baseband signals for a transmit signal path of the RF circuitry 1406. The baseband circuitry 1410 is configured to interface with application circuitry 1205/1305 (see FIGS. 12 and 13) for generation and processing of the baseband signals and for controlling operations of the RF circuitry 1406. The baseband circuitry 1410 may handle various radio control functions.

The aforementioned circuitry and/or control logic of the baseband circuitry 1410 may include one or more single or multi-core processors. For example, the one or more processors may include a 3G baseband processor 1404A, a 4G/LTE baseband processor 1404B, a 5G/NR baseband processor 1404C, or some other baseband processor(s) 1404D for other existing generations, generations in development or to be developed in the future (e.g., sixth generation (6G), etc.). In other embodiments, some or all of the functionality of baseband processors 1404A-D may be included in modules stored in the memory 1404G and executed via a Central Processing Unit (CPU) 1404E. In other embodiments, some or all of the functionality of baseband processors 1404A-D may be provided as hardware accelerators (e.g., FPGAs, ASICs, etc.) loaded with the appropriate bit streams or logic blocks stored in respective memory cells. In various embodiments, the memory 1404G may store program code of a real-time OS (RTOS), which when executed by the CPU 1404E (or other baseband processor), is to cause the CPU 1404E (or other baseband processor) to manage resources of the baseband circuitry 1410, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1410 includes one or more audio digital signal processor(s) (DSP) 1404F. The audio DSP(s) 1404F include elements for compression/decompression and echo cancellation and may include other suitable processing elements in other embodiments.

In some embodiments, each of the processors 1404A-1404E include respective memory interfaces to send/receive data to/from the memory 1404G. The baseband circuitry 1410 may further include one or more interfaces to communicatively couple to other circuitries/devices, such as an interface to send/receive data to/from memory external to the baseband circuitry 1410; an application circuitry interface to send/receive data to/from the application circuitry 1205/1305 of FIGS. 12-XT); an RF circuitry interface to send/receive data to/from RF circuitry 1406 of FIG. 14; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1325.

In alternate embodiments (which may be combined with the above described embodiments), baseband circuitry 1410 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1410 may include protocol processing circuitry with one or more instances of control circuitry (not shown) to provide control functions for the digital baseband circuitry and/or radio frequency circuitry (e.g., the radio front end modules 1415).

Although not shown by FIG. 14, in some embodiments, the baseband circuitry 1410 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1410 and/or RF circuitry 1406 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1410 and/or RF circuitry 1406 are part of a Wi-Fi communication system. In the second example, the protocol processing circuitry would operate Wi-Fi MAC and logical link control (LLC) functions. The protocol processing circuitry may include one or more memory structures (e.g., 1404G) to store program code and data for operating the protocol functions, as well as one or more processing cores to execute the program code and perform various operations using the data. The baseband circuitry 1410 may also support radio communications for more than one wireless protocol.

The various hardware elements of the baseband circuitry 1410 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1410 may be suitably combined in a single chip or chipset, or disposed on a same circuit board. In another example, some or all of the constituent components of the baseband circuitry 1410 and RF circuitry 1406 may be implemented together such as, for example, a system on a chip (SoC) or System-in-Package (SiP). In another example, some or all of the constituent components of the baseband circuitry 1410 may be implemented as a separate SoC that is communicatively coupled with and RF circuitry 1406 (or multiple instances of RF circuitry 1406). In yet another example, some or all of the constituent components of the baseband circuitry 1410 and the application circuitry 1205/1305 may be implemented together as individual SoCs mounted to a same circuit board (e.g., a "multi-chip package").

In some embodiments, the baseband circuitry 1410 may provide for communication compatible with one or more radio technologies. For example, in some embodiments, the baseband circuitry 1410 may support communication with an E-UTRAN or other WMAN, a WLAN, a WPAN. Embodiments in which the baseband circuitry 1410 is configured to support radio communications of more than one wireless protocol may be referred to as multi-mode baseband circuitry.

RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. RF circuitry 1406 may include a receive signal path, which may include circuitry to down-convert RF signals received from the FEM circuitry 1408 and provide baseband signals to the baseband circuitry 1410. RF circuitry 1406 may also include a transmit signal path, which may include circuitry to up-convert baseband signals provided by the baseband circuitry 1410 and provide RF output signals to the FEM circuitry 1408 for transmission.

In some embodiments, the receive signal path of the RF circuitry 1406 may include mixer circuitry 1406a, amplifier circuitry 1406b and filter circuitry 1406c. In some embodiments, the transmit signal path of the RF circuitry 1406 may include filter circuitry 1406c and mixer circuitry 1406a. RF circuitry 1406 may also include synthesizer circuitry 1406d for synthesizing a frequency for use by the mixer circuitry 1406a of the receive signal path and the transmit signal path. In some embodiments, the mixer circuitry 1406a of the receive signal path may be configured to down-convert RF signals received from the FEM circuitry 1408 based on the synthesized frequency provided by synthesizer circuitry 1406d. The amplifier circuitry 1406b may be configured to amplify the down-converted signals and the filter circuitry 1406c may be a low-pass filter (LPF) or band-pass filter (BPF) configured to remove unwanted signals from the down-converted signals to generate output baseband signals. Output baseband signals may be provided to the baseband circuitry 1410 for further processing. In some embodiments, the output baseband signals may be zero-frequency baseband signals, although this is not a requirement. In some embodiments, mixer circuitry 1406a of the receive signal path may comprise passive mixers, although the scope of the embodiments is not limited in this respect.

In some embodiments, the mixer circuitry 1406a of the transmit signal path may be configured to up-convert input baseband signals based on the synthesized frequency provided by the synthesizer circuitry 1406d to generate RF output signals for the FEM circuitry 1408. The baseband signals may be provided by the baseband circuitry 1410 and may be filtered by filter circuitry 1406c.

In some embodiments, the mixer circuitry 1406a of the receive signal path and the mixer circuitry 1406a of the transmit signal path may include two or more mixers and may be arranged for quadrature downconversion and upconversion, respectively. In some embodiments, the mixer circuitry 1406a of the receive signal path and the mixer circuitry 1406a of the transmit signal path may include two or more mixers and may be arranged for image rejection (e.g., Hartley image rejection). In some embodiments, the mixer circuitry 1406a of the receive signal path and the mixer circuitry 1406a of the transmit signal path may be arranged for direct downconversion and direct upconversion, respectively. In some embodiments, the mixer circuitry 1406a of the receive signal path and the mixer circuitry 1406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1406 may include analog-to-digital converter (ADC) and digital-to-analog converter (DAC) circuitry and the baseband circuitry 1410 may include a digital baseband interface to communicate with the RF circuitry 1406.

In some dual-mode embodiments, a separate radio IC circuitry may be provided for processing signals for each spectrum, although the scope of the embodiments is not limited in this respect.

In some embodiments, the synthesizer circuitry 1406d may be a fractional-N synthesizer or a fractional N/N+1 synthesizer, although the scope of the embodiments is not limited in this respect as other types of frequency synthesizers may be suitable. For example, synthesizer circuitry 1406d may be a delta-sigma synthesizer, a frequency multiplier, or a synthesizer comprising a phase-locked loop with a frequency divider.

The synthesizer circuitry 1406d may be configured to synthesize an output frequency for use by the mixer circuitry 1406a of the RF circuitry 1406 based on a frequency input and a divider control input. In some embodiments, the synthesizer circuitry 1406d may be a fractional N/N+1 synthesizer.

In some embodiments, frequency input may be provided by a voltage controlled oscillator (VCO), although that is not a requirement. Divider control input may be provided by either the baseband circuitry 1410 or the application circuitry 1205/1305 depending on the desired output frequency. In some embodiments, a divider control input (e.g., N) may be determined from a look-up table based on a channel indicated by the application circuitry 1205/1305.

Synthesizer circuitry 1406d of the RF circuitry 1406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

FEM circuitry 1408 may include a receive signal path, which may include circuitry configured to operate on RF signals received from antenna array 1411, amplify the received signals and provide the amplified versions of the received signals to the RF circuitry 1406 for further processing. FEM circuitry 1408 may also include a transmit signal path, which may include circuitry configured to amplify signals for transmission provided by the RF circuitry 1406 for transmission by one or more of antenna elements of antenna array 1411. In various embodiments, the amplification through the transmit or receive signal paths may be done solely in the RF circuitry 1406, solely in the FEM circuitry 1408, or in both the RF circuitry 1406 and the FEM circuitry 1408.

In some embodiments, the FEM circuitry 1408 may include a TX/RX switch to switch between transmit mode and receive mode operation. The FEM circuitry 1408 may include a receive signal path and a transmit signal path. The receive signal path of the FEM circuitry 1408 may include an LNA to amplify received RF signals and provide the amplified received RF signals as an output (e.g., to the RF circuitry 1406). The transmit signal path of the FEM circuitry 1408 may include a power amplifier (PA) to amplify input RF signals (e.g., provided by RF circuitry 1406), and one or more filters to generate RF signals for subsequent transmission by one or more antenna elements of the antenna array 1411.

The antenna array 1411 comprises one or more antenna elements, each of which is configured convert electrical signals into radio waves to travel through the air and to convert received radio waves into electrical signals. For example, digital baseband signals provided by the baseband circuitry 1410 is converted into analog RF signals (e.g., modulated waveform) that will be amplified and transmitted via the antenna elements of the antenna array 1411 including one or more antenna elements (not shown). The antenna elements may be omnidirectional, direction, or a combination thereof. The antenna elements may be formed in a multitude of arranges as are known and/or discussed herein. The antenna array 1411 may comprise microstrip antennas or printed antennas that are fabricated on the surface of one or more printed circuit boards. The antenna array 1411 may be formed in as a patch of metal foil (e.g., a patch antenna) in a variety of shapes, and may be coupled with the RF circuitry 1406 and/or FEM circuitry 1408 using metal transmission lines or the like.

Processors of the application circuitry 1205/1305 and processors of the baseband circuitry 1410 may be used to execute elements of one or more instances of a protocol stack. For example, processors of the baseband circuitry 1410, alone or in combination, may be used execute Layer 3, Layer 2, or Layer 1 functionality, while processors of the application circuitry 1205/1305 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 15:
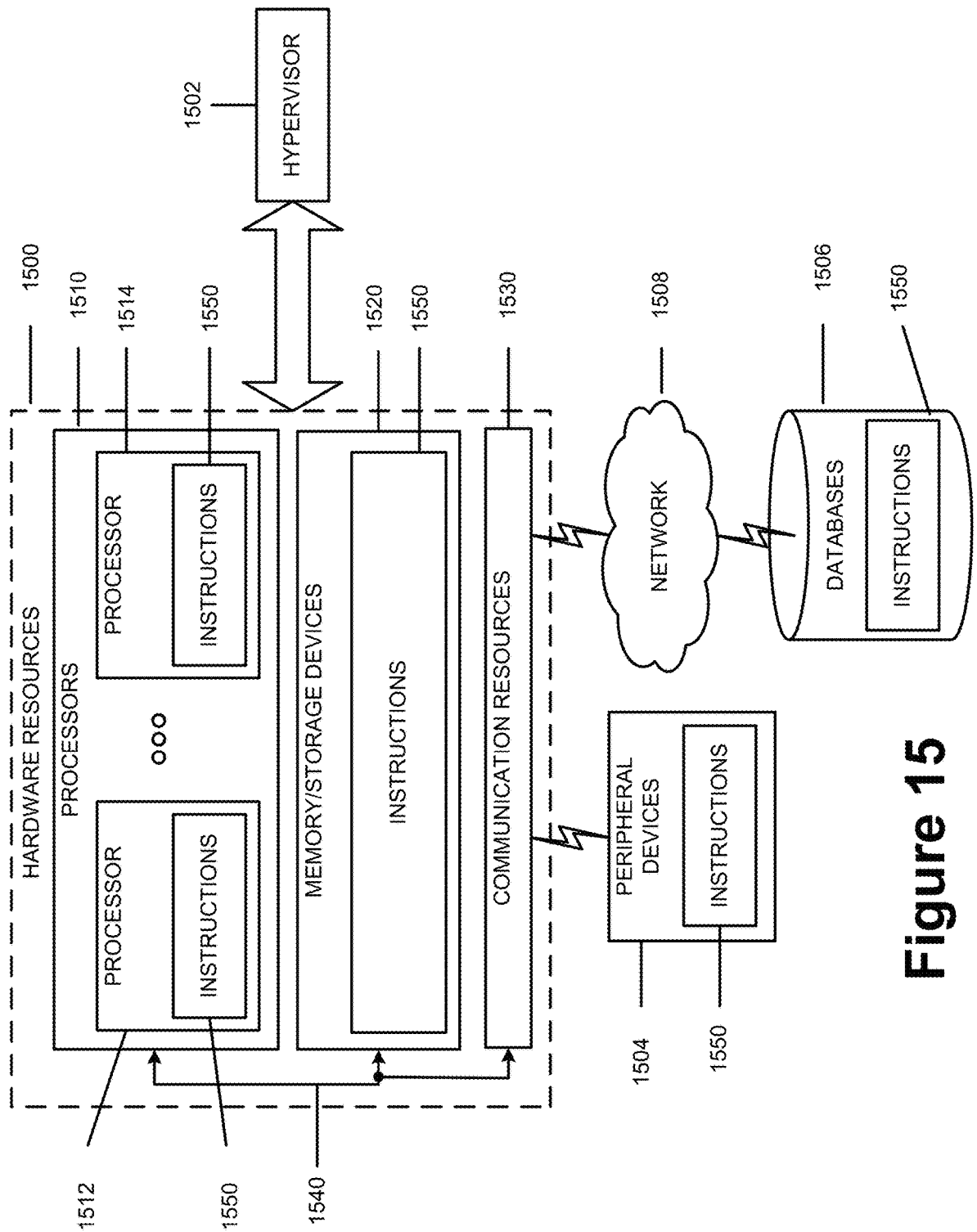
FIG. 15 is a block diagram illustrating components, according to some example embodiments, able to read instructions from a machine-readable or computer-readable medium (e.g., a non-transitory machine-readable storage medium) and perform any one or more of the methodologies discussed herein.

FIG. 15 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1500 including one or more processors (or processor cores) 1510, one or more memory/storage devices 1520, and one or more communication resources 1530, each of which may be communicatively coupled via a bus 1540. For embodiments where node virtualization (e.g., NFV) is utilized, a hypervisor 1502 may be executed to provide an execution environment for one or more network slices/sub-slices to utilize the hardware resources 1500.

The processors 1510 may include, for example, a processor 1512 and a processor 1514. The processor(s) 1510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1520 may include main memory, disk storage, or any suitable combination thereof. The memory/storage devices 1520 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1530 may include interconnection or network interface components or other suitable devices to communicate with one or more peripheral devices 1504 or one or more databases 1506 via a network 1508. For example, the communication resources 1530 may include wired communication components (e.g., for coupling via USB), cellular communication components, NFC components, Bluetooth® (or Bluetooth® Low Energy) components, Wi-Fi® components, and other communication components.

Instructions 1550 may comprise software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 or the databases 1506. Accordingly, the memory of processors 1510, the memory/storage devices 1520, the peripheral devices 1504, and the databases 1506 are examples of computer-readable and machine-readable media.

Example Procedures

Figure 9:
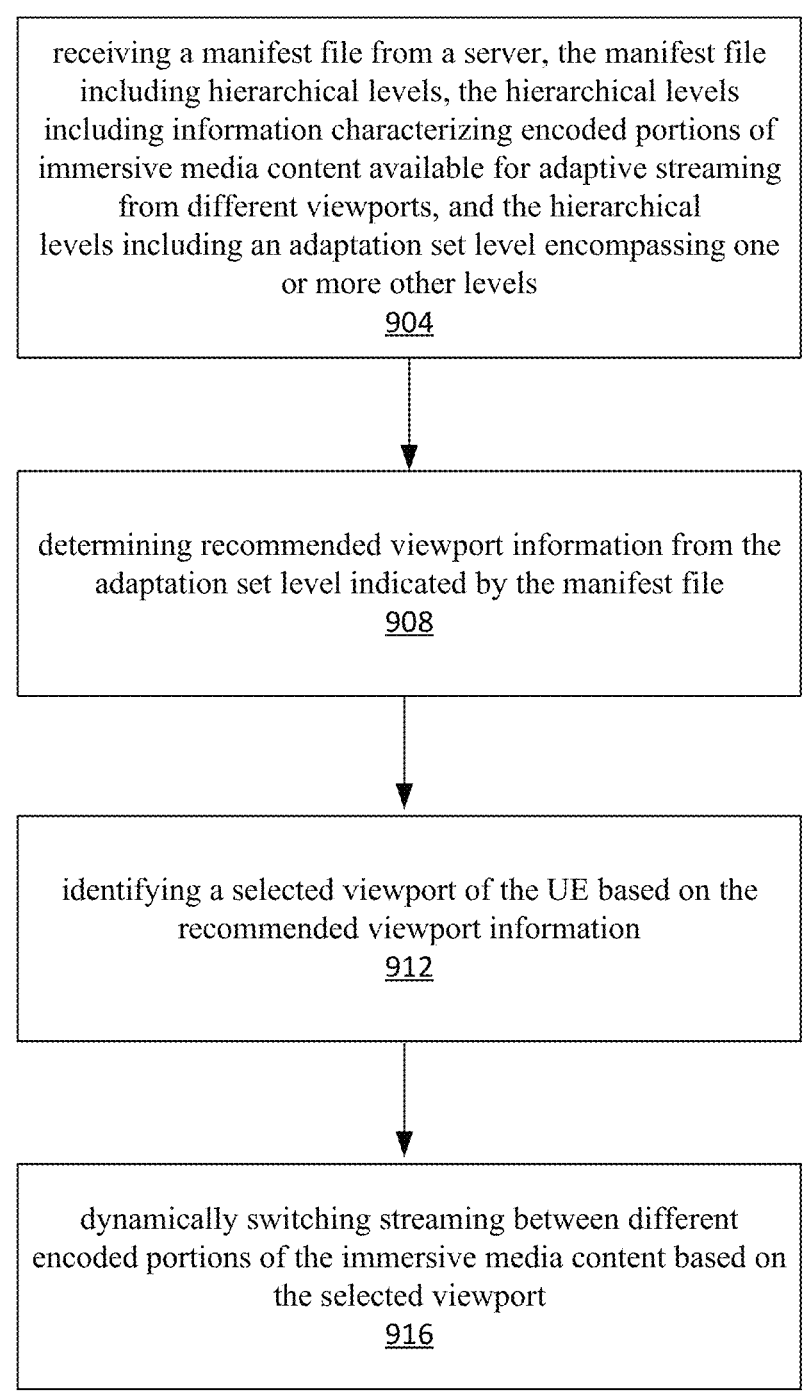
FIG. 9 illustrates a process of a user equipment (UE) in accordance with various embodiments.

In some embodiments, the electronic device(s), network(s), system(s), chip(s) or component(s), or portions or implementations thereof, of FIGS. 11-15, or some other figure herein, may be configured to perform one or more processes, techniques, or methods as described herein, or portions thereof. One such process 900 is depicted in FIG. 9. In embodiments, the process 900 may be performed by a UE or a portion thereof (e.g., baseband circuitry of the UE).

The process 900 may include, at 904, receiving a manifest file from a server, the manifest file including hierarchical levels, the hierarchical levels including information characterizing encoded portions of immersive media content available for adaptive streaming from different viewports, and the hierarchical levels including an adaptation set level encompassing one or more other levels. At 908, the process 900 may further include determining recommended viewport information from the adaptation set level indicated by the manifest file. At 912, the process 900 may further include identifying a selected viewport of the UE based on the recommended viewport information. For example, the selected viewport may be identified using one or more sensors and/or control mechanisms of the UE. At 916, the process 900 may further include dynamically switching streaming between different encoded portions of the immersive media content based on the selected viewport.

Figure 10:
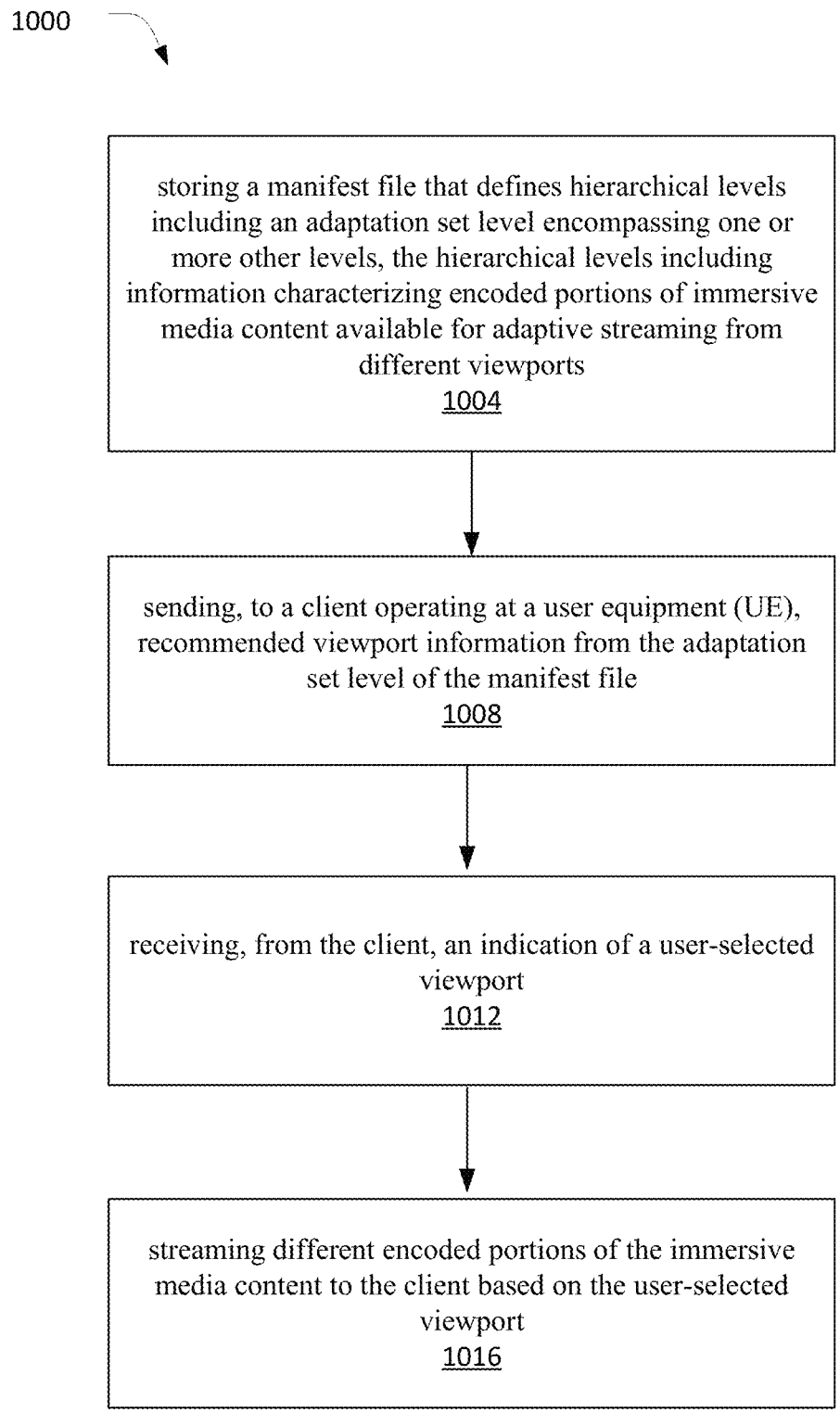
FIG. 10 illustrates a process of a server in accordance with various embodiments.

FIG. 10 illustrates another process 1000 in accordance with various embodiments. In embodiments, the process 1000 may be performed by a server (e.g., a media server) or a portion thereof (e.g., baseband circuitry of the server). At 1004, the process 1000 may include storing a manifest file that defines hierarchical levels including an adaptation set level encompassing one or more other levels, the hierarchical levels including information characterizing encoded portions of immersive media content available for adaptive streaming from different viewports. At 1008, the process may further include sending, to a client operating at a user equipment (UE), recommended viewport information from the adaptation set level of the manifest file. At 1012, the process 1000 may further include receiving, from the client, an indication of a user-selected viewport. At 1016, the process 1000 may further include streaming different encoded portions of the immersive media content to the client based on the user-selected viewport.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include an apparatus contained within a user equipment (UE) operable to decode immersive media streamed using the dynamic adaptive streaming over HTTP (DASH) content format received from a server, the apparatus comprising one or more processors and memory configured to: decode a media presentation description (MPD) file received from the server that includes information for each of a plurality of DASH-based adaptations and representations containing immersive media; decode, at the UE, a network assistance message received from the server for a client operating at the UE, the network assistance message including an indication of a recommended viewport for the client operating at the UE; select one or more representations of DASH content from the MPD based on the recommended viewport indicated in the network assistance message for the client operating at the UE; and decode the selected representations of DASH content received from the server.

Example 2 may include the apparatus of example 1 or some other example herein, further comprising a transceiver configured to: receive, from the server, the network assistance message that includes the indication of the recommended viewport assigned to the client operating at the UE; and receive the selected representation of DASH content from the server.

Example 3 may include the apparatus of example 1 or some other example herein, wherein the recommended viewport is a 3D viewport corresponding to a spherical region of the immersive media.

Example 4 may include the apparatus of example 3 or some other example herein, wherein the network assistance message contains one or more of the syntax elements center_azimuth, center_elevation, center_tilt, azimuth_range, and elevation_range to indicate the spherical coordinate system (to cover rotational movements of the viewport), plus syntax elements center_x, center_y and center_z to indicate the x-y-z coordinates of the center point of the sphere that contains the viewport (to cover translational movements of the viewport) as well as a point cloud object identifier and point cloud context information.

Example 5 may include the apparatus of example 1 or some other example herein, wherein the recommended viewport is a 2D viewport corresponding to a planar region of the immersive media.

Example 6 may include the apparatus of example 5 or some other example herein, wherein the network assistance message contains one or more of the syntax elements center_azimuth, center_elevation, center_tilt, width_range, and height_range to indicate the rectangular coordinate system (to cover planar movements of the viewport), plus syntax elements center_x, center_y and center_z to indicate the x-y-z coordinates of the center point of the sphere that contains the viewport (to cover translational movements of the viewport) as well as a point cloud object identifier and point cloud context information.

Example 7 may include the apparatus of example 1 or some other example herein, wherein the client operating at the UE obtains the network assistance message containing recommended viewport information from the server using an HTTP GET request Example 8 may include the apparatus of example 1 or some other example herein, wherein the client operating at the UE obtains the network assistance message containing recommended viewport information from the server using the WebSocket protocol Example 9 may include the apparatus of example 1 or some other example herein, wherein the network assistance message containing recommended viewport information is a SAND PER message.

Example 10 may include the apparatus of example 1 or some other example herein, wherein the one or more processors include one or more of a baseband processor or an application processor.

Example 11 may include an apparatus contained within a user equipment (UE) operable to decode immersive media streamed using the dynamic adaptive streaming over HTTP (DASH) content format received from a server, the apparatus comprising one or more processors and memory configured to: send to the server a feedback message for a client operating at the UE, the feedback message including an indication of a selected viewport for the client operating at the UE;

Example 12 may include the apparatus of example 11 or some other example herein, wherein the selected viewport is a 3D viewport corresponding to a spherical region of the immersive media.

Example 13 may include the apparatus of example 12 or some other example herein, wherein the feedback message contains one or more of the syntax elements center_azimuth, center_elevation, center_tilt, azimuth_range, and elevation_range to indicate the spherical coordinate system (to cover rotational movements of the viewport), plus syntax elements center_x, center_y and center_z to indicate the x-y-z coordinates of the center point of the sphere that contains the viewport (to cover translational movements of the viewport) as well as a point cloud object identifier and point cloud context information.

Example 14 may include the apparatus of example 11 or some other example herein, wherein the selected viewport is a 2D viewport corresponding to a planar region of the immersive media.

Example 15 may include the apparatus of example 15 or some other example herein, wherein the feedback message contains one or more of the syntax elements center_azimuth, center_elevation, center_tilt, width_range, and height_range to indicate the rectangular coordinate system (to cover planar movements of the viewport), plus syntax elements center_x, center_y and center_z to indicate the x-y-z coordinates of the center point of the sphere that contains the viewport (to cover translational movements of the viewport) as well as a point cloud object identifier and point cloud context information.

Example 16 may include the apparatus of example 11 or some other example herein, wherein the client operating at the UE sends the feedback message containing selected viewport information to the server as part of the HTTP header when requesting DASH segments using HTTP GET messages Example 17 may include the apparatus of example 11 or some other example herein, wherein the client operating at the UE sends the feedback message containing selected viewport information to the server using HTTP POST messages Example 18 may include the apparatus of example 11 or some other example herein, wherein the client operating at the UE sends the feedback message containing selected viewport information from the server using the WebSocket protocol Example 19 may include the apparatus of example 11 or some other example herein, wherein the feedback message containing selected viewport information is a SAND status message.

Example 20 may include the apparatus of example 11 or some other example herein, wherein the one or more processors include one or more of a baseband processor or an application processor.

Example 21 may include an apparatus of a server operable to provide dynamic adaptive streaming over HTTP (DASH) content to a client operating at a user equipment (UE), the apparatus comprising one or more processors and memory configured to: obtain, at the server, a selected viewport information for a first client operating at the first UE via a feedback message from that client; encode, at the server, a network assistance message for transmission to a second client operating at the second UE, the network assistance message including an indication of the recommended viewport for the second client that is identical to the selected viewport of the first client; and send the network assistance message to the second client operating at the second UE.

Example 22 may include the apparatus of example 21 or some other example herein, further comprising a transceiver configured to: receive the feedback message that includes the indication of the selected viewport for the first client operating at the first UE; and transmit the network assistance message that includes the indication of the recommended viewport for the second client operating at the second UE; and transmit the DASH content to the first and second clients operating at the first and second UE, respectively.

Example 23 may include the apparatus of example 21 or some other example herein, wherein the selected viewport and recommended viewport are 3D viewports corresponding to spherical regions of the immersive media.

Example 24 may include the apparatus of example 23 or some other example herein, wherein the feedback message and network assistance message contain one or more of the syntax elements center_azimuth, center_elevation, center_tilt, azimuth_range, and elevation_range to indicate the spherical coordinate system (to cover rotational movements of the viewport), plus syntax elements center_x, center_y and center_z to indicate the x-y-z coordinates of the center point of the sphere that contains the viewport (to cover translational movements of the viewport) as well as a point cloud object identifier and point cloud context information.

Example 25 may include the apparatus of example 24 or some other example herein, wherein the selected viewport and recommended viewport are 2D viewports corresponding to planar regions of the immersive media.

Example 26 may include the apparatus of example 25 or some other example herein, wherein the feedback message and network assistance message contain one or more of the syntax elements center_azimuth, center_elevation, center_tilt, width_range, and height_range to indicate the rectangular coordinate system (to cover planar movements of the viewport), plus syntax elements center_x, center_y and center_z to indicate the x-y-z coordinates of the center point of the sphere that contains the viewport (to cover translational movements of the viewport) as well as a point cloud object identifier and point cloud context information.

Example 27 may include the apparatus of example 21 or some other example herein, wherein the feedback message containing selected viewport information is a SAND status message and the network assistance message containing the recommended viewport information is a SAND PER message.

Example 28 may include the apparatus of example 21 or some other example herein, wherein the one or more processors include one or more of a baseband processor or an application processor.

Example 29 includes an apparatus contained within a user equipment (UE) operable to decode immersive media streamed using an adaptive streaming content format received from a server, the apparatus comprising: transceiver circuitry communicatively coupled with processor circuitry, the transceiver circuitry configured to request and receive a manifest file from the server that defines hierarchical levels including an adaptation set level encompassing one or more other levels, the hierarchical levels including information characterizing encoded portions of immersive media content available for adaptive streaming from different viewports; and the processor circuitry and memory circuitry configured to: obtain recommended viewport information from the adaptation set level of the manifest file; identify the user's selected viewport using the various sensor or control mechanisms in the UE; and dynamically switch streaming between different encoded portions of the immersive media content based on the viewport, depending on the user's selected viewport.

Example 30 includes the apparatus of example 29 and/or some other examples herein, wherein the adaptive streaming format is the dynamic adaptive streaming over HTTP (DASH) content format and the manifest file is a DASH media presentation description (MPD)

Example 31 includes the apparatus of example 29 and/or some other examples herein, wherein the immersive media content is point cloud video content Example 32 includes the apparatus of example 29 and/or some other examples herein, wherein the server stores different versions of the immersive media content produced and encoded for different recommended viewports indicated in the manifest file Example 33 includes the apparatus of example 29 and/or some other examples herein, wherein the recommended viewport is a 3D viewport corresponding to a spherical region of the immersive media.

Example 34 includes the apparatus of example 33 and/or some other examples herein, wherein the recommended viewport information in the manifest file contains one or more of the syntax elements center_azimuth, center_elevation, center tilt, azimuth_range, and elevation_range to indicate the spherical coordinate system (to cover rotational movements of the viewport), plus syntax elements center_x, center_y and center_z to indicate the x-y-z coordinates of the center point of the sphere that contains the viewport (to cover translational movements of the viewport) as well as a point cloud object identifier and point cloud context information.

Example 35 includes the apparatus of example 29 and/or some other examples herein, wherein the recommended viewport is a 2D viewport corresponding to a planar region of the immersive media.

Example 36 includes the apparatus of example 35 and/or some other examples herein, wherein the recommended viewport information in the manifest file contains one or more of the syntax elements center_azimuth, center_elevation, center tilt, width_range, and height range to indicate the rectangular coordinate system (to cover planar movements of the viewport), plus syntax elements center_x, center_y and center_z to indicate the x-y-z coordinates of the center point of the sphere that contains the viewport (to cover translational movements of the viewport) as well as a point cloud object identifier and point cloud context information.

Example 37 includes the apparatus of example 29 and/or some other examples herein, wherein the DASH client in the UE selects and requests DASH representations from the network based on the recommended viewports signaled in the MPD by matching them to the user's selected viewport.

Example 38 includes the apparatus of example 29 and/or some other examples herein, wherein the one or more processors include one or more of a baseband processor or an application processor.

Example 39 includes an apparatus of a server operable to provide immersive media content of an adaptive streaming format to a client operating at a user equipment (UE), the apparatus comprising: processor circuitry and memory circuitry configured to store a manifest file that defines hierarchical levels including an adaptation set level encompassing one or more other levels, the hierarchical levels including information characterizing encoded portions of immersive media content available for adaptive streaming from different viewports; and transceiver circuitry communicatively coupled with the processor circuitry, the transceiver circuitry configured to: send recommended viewport information to the client from the adaptation set level of the manifest file; and stream different encoded portions of the immersive media content to the client based on the viewport, depending on the client's selected viewport.

Example 40 includes the apparatus of example 39 and/or some other examples herein, wherein the adaptive streaming format is the dynamic adaptive streaming over HTTP (DASH) content format and the manifest file is a DASH media presentation description (MPD)

Example 41 includes the apparatus of example 39 and/or some other examples herein, wherein the immersive media content is point cloud video content Example 42 includes the apparatus of example 39 and/or some other examples herein, wherein the server stores different versions of the immersive media content produced and encoded for different recommended viewports indicated in the manifest file Example 43 includes the apparatus of example 39 and/or some other examples herein, wherein the recommended viewport is a 3D viewport corresponding to a spherical region of the immersive media.

Example 44 includes the apparatus of example 43 and/or some other examples herein, wherein the recommended viewport information in the manifest file contains one or more of the syntax elements center_azimuth, center_elevation, center tilt, azimuth_range, and elevation_range to indicate the spherical coordinate system (to cover rotational movements of the viewport), plus syntax elements center_x, center_y and center_z to indicate the x-y-z coordinates of the center point of the sphere that contains the viewport (to cover translational movements of the viewport) as well as a point cloud object identifier and point cloud context information.

Example 45 includes the apparatus of example 39 and/or some other examples herein, wherein the recommended viewport is a 2D viewport corresponding to a planar region of the immersive media.

Example 46 includes the apparatus of example 45 and/or some other examples herein, wherein the recommended viewport information in the manifest file contains one or more of the syntax elements center_azimuth, center_elevation, center tilt, width_range, and height range to indicate the rectangular coordinate system (to cover planar movements of the viewport), plus syntax elements center_x, center_y and center_z to indicate the x-y-z coordinates of the center point of the sphere that contains the viewport (to cover translational movements of the viewport) as well as a point cloud object identifier and point cloud context information.

Example 47 includes the apparatus of example 39 and/or some other examples herein, wherein DASH client in the UE selects and requests DASH representations from the network based on the recommended viewports signaled in the MPD by matching them to the user's selected viewport.

Example 48 includes the apparatus of example 39 and/or some other examples herein, wherein the one or more processors include one or more of a baseband processor or an application processor.

Example 49 includes a method of operating a user equipment (UE), the method comprising: receiving, receiving a manifest file from a server (e.g., in response to a request for the manifest file), the manifest file including hierarchical levels, the hierarchical levels including information characterizing encoded portions of immersive media content available for adaptive streaming from different viewports, and the hierarchical levels including an adaptation set level encompassing one or more other levels; determining recommended viewport information from the adaptation set level indicated by the manifest file; identifying a selected viewport based on the recommended viewport information (e.g., using one or more sensors and/or control mechanisms of the UE); and dynamically switching streaming between different encoded portions of the immersive media content based on the selected viewport.

Example 50 includes the method of example 49 and/or some other examples herein, wherein the adaptive streaming format is a dynamic adaptive streaming over HTTP (DASH) content format and the manifest file is a DASH media presentation description (MPD).

Example 51 includes the method of example 49-50 and/or some other examples herein, further comprising: determining a user selected viewport; selecting, by a DASH client in the UE, one or more DASH representations based on the recommended viewports indicated by the MPD that match the user selected viewport; and transmit, to the server, a request for the selected one or more DASH representations.

Example 52 includes the method of examples 49-51 and/or some other examples herein, wherein the immersive media content is point cloud video content.

Example 53 includes the method of examples 49-52 and/or some other examples herein, wherein different versions of the immersive media content are stored at the server or associated storage systems, and each of the different versions are produced and encoded for different recommended viewports indicated by the manifest file.

Example 54 includes the method of examples 49-53 and/or some other examples herein, wherein the recommended viewport is a 3D viewport corresponding to a spherical region of the immersive media.

Example 55 includes the method of examples 49-53 and/or some other examples herein, wherein the recommended viewport is a 2D viewport corresponding to a planar region of the immersive media.

Example 56 includes the method of examples 54-55 and/or some other examples herein, wherein the recommended viewport information in the manifest file includes syntax elements, a point cloud object identifier, and point cloud context information, the syntax elements including first syntax elements to indicate a spherical coordinate system and to cover rotational movements of the viewport, and second syntax elements to indicate Cartesian coordinates of a center point of a sphere that contains the viewport and to cover translational movements of the viewport.

Example 57 includes the method of example 56 and/or some other examples herein, wherein the first syntax elements include center_azimuth, center_elevation, center tilt, azimuth_range, and elevation_range; and the second syntax elements include center_x, center_y, and center_z.

Example 58 includes the method of examples 56-57 and/or some other examples herein, wherein the recommended viewport information includes contextual information along with, or instead of, the coordinate-based description of the content coverage, wherein the contextual information includes a string value associated with each adaptation set level to carry relevant contextual information, an object identifier (ID) value indicating a specific point cloud object from which the viewport is to be derived, and/or the contextual information includes a patch ID value indicating a specific point cloud patch from which the viewport is to be derived.

Example 59 includes an method of operating a server, the method comprising: storing a manifest file that defines hierarchical levels including an adaptation set level encompassing one or more other levels, the hierarchical levels including information characterizing encoded portions of immersive media content available for adaptive streaming from different viewports; sending, to a client operating at a UE, recommended viewport information from the adaptation set level of the manifest file; receiving, from the client, an indication of a user-selected viewport; and streaming different encoded portions of the immersive media content to the client based on the user-selected viewport.

Example 60 includes the method of example 59 and/or some other examples herein, wherein the adaptive streaming format is a dynamic adaptive streaming over HTTP (DASH) content format and the manifest file is a DASH media presentation description (MPD).

Example 61 includes the method of example 59-60 and/or some other examples herein, wherein the indication of the user-selected viewport include one or more DASH representations based on the recommended viewport information indicated by the MPD that match the user-selected viewport; and the different encoded portions of the immersive media content are the one or more DASH representations.

Example 62 includes the method of examples 59-61 and/or some other examples herein, wherein the immersive media content is point cloud video content.

Example 63 includes the method of examples 59-62 and/or some other examples herein, wherein different versions of the immersive media content are stored at the server or associated storage systems, and each of the different versions are produced and encoded for different recommended viewports indicated by the manifest file.

Example 64 includes the method of examples 59-63 and/or some other examples herein, wherein the recommended viewport is a 3D viewport corresponding to a spherical region of the immersive media.

Example 65 includes the method of examples 59-63 and/or some other examples herein, wherein the recommended viewport is a 2D viewport corresponding to a planar region of the immersive media.

Example 66 includes the method of examples 64-65 and/or some other examples herein, wherein the recommended viewport information in the manifest file includes syntax elements, a point cloud object identifier, and point cloud context information, the syntax elements including first syntax elements to indicate a spherical coordinate system and to cover rotational movements of the viewport, and second syntax elements to indicate Cartesian coordinates of a center point of a sphere that contains the viewport and to cover translational movements of the viewport.

Example 67 includes the method of example 66 and/or some other examples herein, wherein the first syntax elements include center_azimuth, center_elevation, center tilt, azimuth_range, and elevation_range; and the second syntax elements include center_x, center_y, and center_z.

Example 68 includes the method of examples 66-67 and/or some other examples herein, wherein the recommended viewport information includes contextual information along with, or instead of, the coordinate-based description of the content coverage, wherein the contextual information includes a string value associated with each adaptation set level to carry relevant contextual information, an object identifier (ID) value indicating a specific point cloud object from which the viewport is to be derived, and/or the contextual information includes a patch ID value indicating a specific point cloud patch from which the viewport is to be derived.

Example 69 may include an apparatus comprising means to perform one or more elements of a method described in or related to any of examples 1-68, or any other method or process described herein.

Example 70 may include one or more non-transitory computer-readable media comprising instructions to cause an electronic device, upon execution of the instructions by one or more processors of the electronic device, to perform one or more elements of a method described in or related to any of examples 1-68, or any other method or process described herein.

Example 71 may include an apparatus comprising logic, modules, or circuitry to perform one or more elements of a method described in or related to any of examples 1-68, or any other method or process described herein.

Example 72 may include a method, technique, or process as described in or related to any of examples 1-68, or portions or parts thereof.

Example 73 may include an apparatus comprising: one or more processors and one or more computer-readable media comprising instructions that, when executed by the one or more processors, cause the one or more processors to perform the method, techniques, or process as described in or related to any of examples 1-68, or portions thereof.

Example 74 may include a signal as described in or related to any of examples 1-68, or portions or parts thereof.

Example 75 may include a datagram, packet, frame, segment, protocol data unit (PDU), or message as described in or related to any of examples 1-68, or portions or parts thereof, or otherwise described in the present disclosure.

Example 76 may include a signal encoded with data as described in or related to any of examples 1-68, or portions or parts thereof, or otherwise described in the present disclosure.

Example 77 may include a signal encoded with a datagram, packet, frame, segment, protocol data unit (PDU), or message as described in or related to any of examples 1-68, or portions or parts thereof, or otherwise described in the present disclosure.

Example 78 may include an electromagnetic signal carrying computer-readable instructions, wherein execution of the computer-readable instructions by one or more processors is to cause the one or more processors to perform the method, techniques, or process as described in or related to any of examples 1-68, or portions thereof.

Example 79 may include a computer program comprising instructions, wherein execution of the program by a processing element is to cause the processing element to carry out the method, techniques, or process as described in or related to any of examples 1-68, or portions thereof.

Example 80 may include a signal in a wireless network as shown and described herein.

Example 81 may include a method of communicating in a wireless network as shown and described herein.

Example 82 may include a system for providing wireless communication as shown and described herein.

Example 83 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein.

3GP 3GPP file format
3GP-DASH 3GPP Dynamic Adaptive Streaming over HTTP
3GPP Third Generation Partnership Project
4G Fourth Generation
5G Fifth Generation
5GC 5G Core network
3DOF 3 Degrees of freedom
6DOF 6 Degrees of freedom
ACK Acknowledgement
AF Application Function
AHS Adaptive HTTP Streaming
AL-SDU Application Layer—Service Data Unit
AM Acknowledged Mode
AMBR Aggregate Maximum Bit Rate
AMF Access and Mobility Management Function
AMR Adaptive Multi-Rate
AMR-NB Adaptive Multi-Rate—NarrowBand
AMR-WB Adaptive Multi-Rate—WideBand
AMR-WB IO Adaptive Multi-Rate—WideBand Inter-operable Mode, included in the EVS codec
AN Access Network
ANBR Access Network Bitrate Recommendation
ANBRQ Access Network Bitrate Recommendation Query
ANR Automatic Neighbour Relation
AOP Acoustic Overload Point
AP Application Protocol, Antenna Port, Access Point
API Application Programming Interface
APN Access Point Name
APP APPlication-defined RTCP packet
AR Augmented Reality
ARP Allocation and Retention Priority
ARQ Automatic Repeat Request
AS Access Stratum, Application Server
ASN.1 Abstract Syntax Notation One
ATCF Access Transfer Control Function
ATGW Access Transfer GateWay
A/V Audio/Video
AVC Advanced Video Coding
AUSF Authentication Server Function
AWGN Additive White Gaussian Noise
BAP Backhaul Adaptation Protocol
BCH Broadcast Channel
BER Bit Error Ratio
BFD Beam Failure Detection
BLER Block Error Rate
BPSK Binary Phase Shift Keying
BRAS Broadband Remote Access Server
BRIR Binaural Room Impulse Response
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CCO Capacity and Coverage Optimization
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DANE DASH-Aware Network Element
DASH Dynamic Adaptive Streaming over HTTP
DC Dual Connectivity, Direct Current
DCI Downlink Control Information
DF Deployment Flavour
DL Downlink
DMTF Distributed Management Task Force
DPDK Data Plane Development Kit
DM Device Management
DM-RS, DMRS Demodulation Reference Signal
DN Data network
DRB Data Radio Bearer
DRM Digital Rights Management
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
eLAA further enhanced Licensed Assisted Access, further enhanced LAA
FN Frame Number
FoV Field of View
FPGA Field-Programmable Gate Array
FQDN Fully Qualified Domain Name
FR Frequency Range
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Special Mobile
GTP GPRS Tunneling Protocol
GTP-U GPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO, HO Handover
HEVC High-Efficiency Video Coding
HFN HyperFrame Number
HHO Hard Handover
HLR Home Location Register
HN Home Network
HO Handover
HPLMN Home Public Land Mobile Network
HSD HTTP Streaming and Download
HSDPA High Speed Downlink Packet Access
HSN Hopping Sequence Number
HSPA High Speed Packet Access
HSS Home Subscriber Server
HSUPA High Speed Uplink Packet Access
HTML Hypertext Markup Language
HTTP Hyper Text Transfer Protocol
HTTPS Hyper Text Transfer Protocol Secure (https is http/1.1 over SSL, i.e. port 443)
I-Block Information Block
ICCID Integrated Circuit Card Identification
IAB Integrated Access and Backhaul
ICIC Inter-Cell Interference Coordination
ID Identity, identifier
IDFT Inverse Discrete Fourier Transform IDR Instantaneous Decoding Refresh
IE Information element
IBE In-Band Emission
IEEE Institute of Electrical and Electronics Engineers
IEI Information Element Identifier
IEIDL Information Element Identifier Data Length
IETF Internet Engineering Task Force
IF Infrastructure
Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
JBM Jitter Buffer Management
K Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk
LCM LifeCycle Management
LCR Low Chip Rate
LCS Location Services
LCID Logical Channel ID
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement (TSG T WG3 context)
MAC-I MAC used for data integrity of signalling messages (TSG T WG3 context)
MANO Management and Orchestration
MBMS Multimedia Broadcast and Multicast Service
MB SFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIME Multipurpose Internet Mail Extensions
MIMO Multiple Input Multiple Output
mIoT massive IoT
MLC Mobile Location Centre
MM Mobility Management
MME Mobility Management Entity
MN Master Node
MO Measurement Object, Mobile Originated
MPD Media Presentation Description
MPEG Moving Picture Experts Group
MPEG-2 TS Moving Picture Experts Group Transport Stream
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MOS Mean Opinion Score
MS Mobile Station
MRFC Media Resource Function Controller
MRFP Media Resource Function Processor
MSMTSI Multi-Stream Multimedia Telephony Service for IMS
MSRP Message Session Relay Protocol
MTSI Multimedia Telephony Service for IMS
MTU Maximum Transfer Unit
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non-Access Stratum layer NCT Network Connectivity Topology
NC-JT Non-Coherent Joint Transmission
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI 'Network Slice Selection Assistance Information
S-NNSAI Single-NSSAI
NS_SF Network Slice Selection Function
NTP Network Time Protocol
NW Network
NWUS Narrowband wake-up signal, Narrowband WUS
NZP Non-Zero Power
O&M Operation and Maintenance
ODU2 Optical channel Data Unit—type 2
OFDM Orthogonal Frequency Division Multiplexing
OFDMA Orthogonal Frequency Division Multiple Access
OOB Out-of-band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function
PDCF Packetized DRM Content Format
PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PER Parameters Enhancing Reception
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement, Performance Management
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal, Packet switched Streaming Service
PSTN Public Switched Telephone Network
PT-RS Phase-tracking reference signal
PTT Push-to-Talk
PUCCH Physical Uplink Control Channel
PUSCH Physical Uplink Shared Channel
PDP Packet Data Protocol
PLI Picture Loss Indication
PLR Packet Loss Ratio
POI Point Of Interconnect
PSTN Public Switched Telephone Network
PTZF Pan, Tilt, Zoom and Focus
QAM Quadrature Amplitude Modulation
QCI QoS class of identifier
QCL Quasi co-location
QFI QoS Flow ID, QoS Flow Identifier
QMC QoE Measurement Collection
QoS Quality of Service
QP Quantization Parameter
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
REST, RESTful Representational State Transfer
RWS RESTful Web Services
RF Radio Frequency RI Rank Indicator
MV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
ROI Region of Interest
RRC Radio Resource Control, Radio Resource Control layer
RRM Radio Resource Management
RS Reference Signal
RSRP Reference Signal Received Power
RSRQ Reference Signal Received Quality
RS_SI Received Signal Strength Indicator
RSU Road Side Unit
RSTD Reference Signal Time difference
RTCP RTP Control Protocol
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAND Server and Network Assisted DASH
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Session Description Protocol
SDPCapNeg SDP Capability Negotiation
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMIL Synchronised Multimedia Integration Language
SMS Short Message Service
SMSF SMS Function
SMTC SSB-based Measurement Timing Configuration
SN Secondary Node, Sequence Number
SOAP Simple Object Access Protocol
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SRVCC Single Radio Voice Call Continuity
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TFO Tandem-Free Operation
TISPAN Telecoms and Internet converged Services and Protocols for Advanced Network TMMBN Temporary Maximum Media Bit-rate Notification
TMMBR Temporary Maximum Media Bit-rate Request
TLS Transport Layer Security
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
URN Uniform Resource Name
USB Universal Serial Bus
USIM Universal Subscriber Identity Module
USS UE-specific search space
UTF-8 Unicode Transformation Format (the 8-bit form)
UTRA UMTS Terrestrial Radio Access
UTRAN Universal Terrestrial Radio Access Network
UwPTS Uplink Pilot Time Slot
V2I Vehicle-to-Infrastruction
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
V-PCC Video-based Point Cloud Coding
VPLMN Visited Public Land Mobile Network
VPN Virtual Private Network
VR Virtual Reality
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
XRES EXpected user RESponse
XOR eXclusive OR
ZC Zadoff-Chu
ZP Zero Power Terminology For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "admission control" refers to a validation process in communication systems where a check is performed before a connection is established to see if current resources are sufficient for the proposed connection.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by the processor 102 during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory, computer-readable media (NTCRM) having instructions, stored thereon, that when executed by one or more processors cause a user equipment (UE) to:
   receive a manifest file from a server, the manifest file including hierarchical levels, the hierarchical levels including information characterizing encoded portions of immersive media content available for adaptive streaming from different viewports, and the hierarchical levels including an adaptation set level encompassing one or more other levels;
   determine recommended viewport information from the adaptation set level indicated by the manifest file, wherein the recommended viewport information in the manifest file includes syntax elements, a point cloud object identifier, and point cloud context information;
   identify a selected viewport based on the recommended viewport information; and
   dynamically switch streaming between different encoded portions of the immersive media content based on the selected viewport.

2. The one or more NTCRM of claim 1, wherein the immersive media content is in a dynamic adaptive streaming over hypertext transfer protocol (DASH) content format, and wherein the manifest file is a DASH media presentation description (MPD).

3. The one or more NTCRM of claim 2, wherein the instructions, when executed, further cause the UE to:
   determine a user selected viewport;
   select one or more DASH representations based on a recommended viewport indicated by the recommended viewport information that corresponds to the user selected viewport; and
   encode, for transmission to the server, a request for the selected one or more DASH representations.

4. The one or more NTCRM of claim 1, wherein the immersive media content is point cloud video content.

5. The one or more NTCRM of claim 1, wherein the recommended viewport information in the manifest file includes a plurality of recommended viewports associated with respective different versions of the immersive media content.

6. The one or more NTCRM of claim 1, wherein the recommended viewport information indicates a three-dimensional (3D) viewport corresponding to a spherical region of the immersive media content, or a two-dimensional (2D) viewport corresponding to a planar region of the immersive media content.

7. The one or more NTCRM of claim 1, wherein the selected viewport is identified using one or more sensors and/or control mechanisms of the UE.

8. The one or more NTCRM of claim 1, wherein the syntax elements include a center azimuth, a center elevation, a center tilt, an azimuth range, and an elevation range of the viewport, and wherein the syntax elements further include coordinates of a center point of a sphere that contains the viewport.

9. The one or more NTCRM of claim 1, wherein the recommended viewport information includes contextual information that includes one or more of: a string value associated with each adaptation set level to carry relevant contextual information; an object identifier (ID) value indicating a specific point cloud object from which the recommended viewport is to be derived; and/or the a patch ID value indicating a specific point cloud patch from which the recommended viewport is to be derived.

10. One or more non-transitory, computer-readable media (NTCRM) having instructions, stored thereon, that when executed by one or more processors cause a server to:
    store a manifest file that defines hierarchical levels including an adaptation set level encompassing one or more other levels, the hierarchical levels including information characterizing encoded portions of immersive media content available for adaptive streaming from different viewports;
    send, to a client operating at a user equipment (UE), recommended viewport information from the adaptation set level of the manifest file, wherein the recommended viewport information in the manifest file includes syntax elements, a point cloud object identifier, and point cloud context information;
    receive, from the client, an indication of a user-selected viewport; and
    stream different encoded portions of the immersive media content to the client based on the user-selected viewport.

11. The one or more NTCRM of claim 10, wherein the immersive media content is in a dynamic adaptive streaming over HTTP (DASH) content format, and wherein the manifest file is a DASH media presentation description (MPD).

12. The one or more NTCRM of claim 11, wherein the indication of the user-selected viewport includes one or more DASH representations based on the recommended viewport information indicated by the MPD that match the user-selected viewport; and the different encoded portions of the immersive media content are the one or more DASH representations.

13. The one or more NTCRM of claim 10, wherein the immersive media content is point cloud video content.

14. The one or more NTCRM of claim 10, wherein different versions of the immersive media content are stored at the server or associated storage systems, and each of the different versions are produced and encoded for different recommended viewports indicated by the manifest file.

15. The one or more NTCRM of claim 10, wherein the recommended viewport information indicates a three-dimensional (3D) viewport corresponding to a spherical region of the immersive media content.

16. The one or more NTCRM of claim 10, wherein the recommended viewport information indicates a two-dimensional (2D) viewport corresponding to a planar region of the immersive media content.

17. The one or more NTCRM of claim 10, wherein the syntax elements include a center azimuth, a center elevation, a center tilt, an azimuth range, and an elevation range of the viewport, and wherein the syntax elements further include coordinates of a center point of a sphere that contains the viewport.

18. The one or more NTCRM of claim 10, wherein the recommended viewport information includes contextual information that includes one or more of: a string value associated with each adaptation set level to carry relevant contextual information; an object identifier (ID) value indicating a specific point cloud object from which a recommended viewport is to be derived; and/or the a patch ID value indicating a specific point cloud patch from which the recommended viewport is to be derived.

* * * * *

UNITED STATES PATENT AND TRADEMARK OFFICE
CERTIFICATE OF CORRECTION

PATENT NO. : 11,729,243 B2
APPLICATION NO. : 17/027524
DATED : August 15, 2023
INVENTOR(S) : Ozgur Oyman Page 1 of 1

It is certified that error appears in the above-identified patent and that said Letters Patent is hereby corrected as shown below:

In the Claims

Column 66
Line 15, Claim 9 change "the" after "from which" to "an".

Signed and Sealed this
Twelfth Day of September, 2023

Katherine Kelly Vidal
*Director of the United States Patent and Trademark Office*